(12) United States Patent
Wang et al.

(10) Patent No.: US 10,557,609 B2
(45) Date of Patent: Feb. 11, 2020

(54) LIGHT PROJECTION DEVICE

(71) Applicant: CHIAN YIH OPTOTECH CO., LTD., Mial-Li Hsien (TW)

(72) Inventors: Cheng Wang, Taipei (TW); Jyun-Lin Lai, Hsinchu County (TW)

(73) Assignee: CHIAN YIH OPTOTECH CO., LTD., Mial-Li Hsien (TW)

( * ) Notice: Subject to any disclaimer, the term of this patent is extended or adjusted under 35 U.S.C. 154(b) by 42 days.

(21) Appl. No.: 16/004,144

(22) Filed: Jun. 8, 2018

(65) Prior Publication Data

US 2018/0356061 A1 Dec. 13, 2018

(30) Foreign Application Priority Data

Jun. 9, 2017 (TW) .............................. 106119269 A

(51) Int. Cl.
| | |
|---|---|
| *F21S 41/25* | (2018.01) |
| *G02B 7/02* | (2006.01) |
| *F21S 41/32* | (2018.01) |
| *F21S 41/19* | (2018.01) |
| *G02B 7/182* | (2006.01) |
| *F21S 41/39* | (2018.01) |
| *F21S 45/43* | (2018.01) |

(Continued)

(52) U.S. Cl.
CPC ............. *F21S 41/25* (2018.01); *F21S 41/147* (2018.01); *F21S 41/148* (2018.01); *F21S 41/19* (2018.01); *F21S 41/192* (2018.01); *F21S 41/255* (2018.01); *F21S 41/295* (2018.01); *F21S 41/32* (2018.01); *F21S 41/321* (2018.01); *F21S 41/39* (2018.01); *F21S 41/47* (2018.01); *F21S 45/43* (2018.01); *F21S 45/48* (2018.01); *G02B 7/02* (2013.01); *G02B 7/182* (2013.01); *G02B 19/0028* (2013.01); *G02B 19/0061* (2013.01)

(58) Field of Classification Search
CPC ........ F21S 41/25; F21S 41/148; F21S 41/255; F21S 41/295; F21S 41/147; F21S 45/48; F21S 41/321; F21S 41/47; F21S 41/192; F21S 45/43; F21S 41/39; F21S 41/19; F21S 41/32; G02B 19/0028; G02B 19/0061; G02B 7/182; G02B 7/02
See application file for complete search history.

(56) References Cited

U.S. PATENT DOCUMENTS

| | | | | |
|---|---|---|---|---|
| 8,414,171 B2 * | 4/2013 | Kawamura | .......... | B60Q 1/2696 362/545 |
| 9,335,017 B2 * | 5/2016 | Nakaya | ................ | G02B 6/0008 |

(Continued)

FOREIGN PATENT DOCUMENTS

JP 2012015067 A * 1/2012

*Primary Examiner* — Bao Q Truong
*Assistant Examiner* — Glenn D Zimmerman
(74) *Attorney, Agent, or Firm* — Li & Cai Intellectual Property (USA) Office

(57) ABSTRACT

The present disclosure provides a light projection device. The light projection device includes a heat dissipation unit, a thermal conducting interface unit, a holding unit, a reflecting unit, a luminous unit, and a lens unit. The thermal conducting interface unit is disposed on the heat dissipation unit and includes a first surface and a second surface. The holding unit is disposed on the heat dissipation unit. The reflecting unit is disposed on the holding unit. The luminous unit includes a first luminous structure disposed on the first surface. The lens unit is disposed on the holding unit.

27 Claims, 19 Drawing Sheets

(51) Int. Cl.
    *F21S 41/47*     (2018.01)
    *F21S 45/48*     (2018.01)
    *F21S 41/147*    (2018.01)
    *F21S 41/29*     (2018.01)
    *F21S 41/255*    (2018.01)
    *G02B 19/00*     (2006.01)
    *F21S 41/148*    (2018.01)

(56)                References Cited

U.S. PATENT DOCUMENTS

| | | | |
|---|---|---|---|
| 2009/0196060 A1* | 8/2009 | Sazuka | B60Q 1/14 |
| | | | 362/509 |
| 2010/0008095 A1* | 1/2010 | Tsukamoto | F21V 19/00 |
| | | | 362/382 |
| 2010/0067249 A1* | 3/2010 | Suzuki | B60Q 1/076 |
| | | | 362/539 |
| 2010/0073950 A1* | 3/2010 | Kawamura | B60Q 1/2696 |
| | | | 362/538 |
| 2010/0181885 A1* | 7/2010 | Tessnow | F21K 9/00 |
| | | | 313/1 |
| 2010/0246203 A1* | 9/2010 | Chen | F21S 41/147 |
| | | | 362/538 |

* cited by examiner

LIGHT PROJECTION DEVICE

CROSS-REFERENCE TO RELATED PATENT APPLICATION

This application claims the benefit of priority to Taiwan Patent Application No. 106119269, filed on Jun. 9, 2017. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an automobile lighting device, and more particularly to a light projection device applied in the automobile lighting device.

BACKGROUND OF THE DISCLOSURE

The existing luminous module of the headlight for motorcycle or automobile could be classified into tungsten halogen lamps, halogen lamps, or high intensity discharge (HID) lamps. Furthermore, "an automobile lighting device and light source module thereof" was disclosed in Taiwan Patent Publication No. M539600, wherein a light-emitting diode (LED) acts as a light source and replaces the existing tungsten halogen lamp, halogen lamp, or HID lamp. However, the heat dissipating effect of "the automobile lighting device and light source module thereof" still needs to be improved.

In Taiwan Patent Publication No. M536321, another "automobile lighting device and light source module thereof" was disclosed. In the art, low-beam illumination is produced by a first luminous component 12 located on a substrate 11 through a reflective shell 14. High-beam illumination is produced by a second luminous component 13 located on the substrate 11 through the reflective shell 14. However, according to the disclosure of Taiwan Patent Publication No. M536321, the substrate 11 is apparently a thick and fundamentally insulated heat-dissipating substrate. Further, referring to FIG. 1 and FIG. 2 of Taiwan Patent Publication No. M536321, each of the first luminous component 12 and the second luminous component 13 is fixed on a ceramic substrate and then further fixed on a metal core printed circuit board (MCPCB). Then, the MCPCB attached with the ceramic substrate and the first luminous component 12 (or the second luminous component 13) is disposed on the substrate 11. Therefore, the heat dissipation paths of both the first luminous component 12 and the second luminous component 13 should go through the ceramic substrate, the MCPCB, and the substrate 11 to reach a heat dissipation component. Due to the long heat dissipation path, the overall heat dissipation efficiency of "the automobile lighting device or the light source module thereof" needed to be improved. As stated above, a distance between a luminous surface of the first luminous component 12 and a luminous surface of the second luminous component 13 is not the shortest, which causes the disadvantages of large volume and low luminous efficiency. Moreover, as disclosed in Taiwan Patent Publication No. M536321, the entire structure including the reflective shell, the shield, the lens, and the luminous component was all disposed on the substrate 11. Therefore, the substrate 11 must support the weight of the entire structure and act as a heat transfer medium at the same time. Furthermore, due to the long distance between the first luminous component 12 and the second luminous component 13, the luminous surface of the first luminous component 12 needs to be fixed near the referenced axis to promote the luminous efficiency of low-beam illumination. As a result, the luminous surface of the second luminous component 13 would be away from the location of the high beam filament of the existing tungsten halogen lamp, halogen lamp, or HID lamp, leading to the low luminous efficiency of high-beam illumination.

SUMMARY OF THE DISCLOSURE

In response to the above-referenced technical inadequacies, the present disclosure provides a light projection device.

In one aspect, the present disclosure provides a light projection device including a heat dissipation unit, a thermal conducting interface unit, a holding unit, a reflective unit, a luminous unit, and a lens unit. The thermal conducting interface unit is disposed on the heat dissipation unit. The thermal conducting interface unit includes a first surface and a second surface opposite to the first surface. The holding unit is disposed on the heat dissipation unit. The reflective unit is disposed on the holding unit. The luminous unit is disposed on the thermal conducting interface unit and includes a first luminous structure disposed on the first surface. The lens unit is disposed on the holding unit.

In one aspect, the present disclosure provides a light projection device including a heat dissipation unit, a thermal conducting interface unit, and a luminous unit. The heat dissipation unit includes a heat dissipation body and a connecting part connected with the heat dissipation body. The thermal conducting interface unit is disposed on the connecting part of the heat dissipation unit. The thermal conducting interface unit includes a thermal conducting interface body, an insulating layer disposed at two opposite sides of the thermal conducting interface body, and a conducting layer disposed at the two opposite sides of the thermal conducting interface body and on the insulating layer. Two opposite sides of the thermal conducting interface body respectively have a first surface and a second surface exposed to the exterior environment. The luminous unit is disposed on the thermal conducting interface unit. The luminous unit includes a first luminous structure disposed on the first surface and a second luminous structure disposed on the second surface. The first luminous structure has a luminous chip and the second luminous structure has a luminous chip. The luminous chip of the first luminous structure is electrically connected to the conducting layer on one side of the thermal conducting interface body. The luminous chip of the second luminous structure is electrically connected to the conducting layer on the other side of the thermal conducting interface body.

In one aspect, the present disclosure provides a light projection device including a thermal conducting interface unit, a reflective unit, a luminous unit, and a lens unit. The thermal conducting interface unit includes a first plate, a second plate, and a connecting plate connected between the first plate and the second plate. A first surface of the first plate is tilted toward a second surface of the second plate.

The reflective unit is disposed on the thermal conducting interface unit and has a first focal point and a second focal point corresponding to the first focal point. The luminous unit includes a first luminous structure disposed on the first surface and a second luminous structure disposed on the second luminous surface. The first luminous structure corresponds to the first focal point of the reflective unit. The lens unit is disposed on the thermal conducting interface unit and has an optical axis and a lens focal point on the optical axis. The lens focal point corresponds to the second focal point of the reflective unit.

Therefore, the light projection device can use the technical feature of "respectively disposing the thermal conducting unit and the holding unit on the heat dissipation unit" to achieve the effect of "separating the heat dissipation path structure and the weight loading structure". Furthermore, the technical feature of "the luminous chip of the first luminous structure and the luminous chip of the second luminous structure are respectively and electrically connected to the conducting layer on the two opposite sides of the thermal conducting interface body" can achieve the effect of "enhancing the luminous efficiency and the heat dissipation efficiency".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
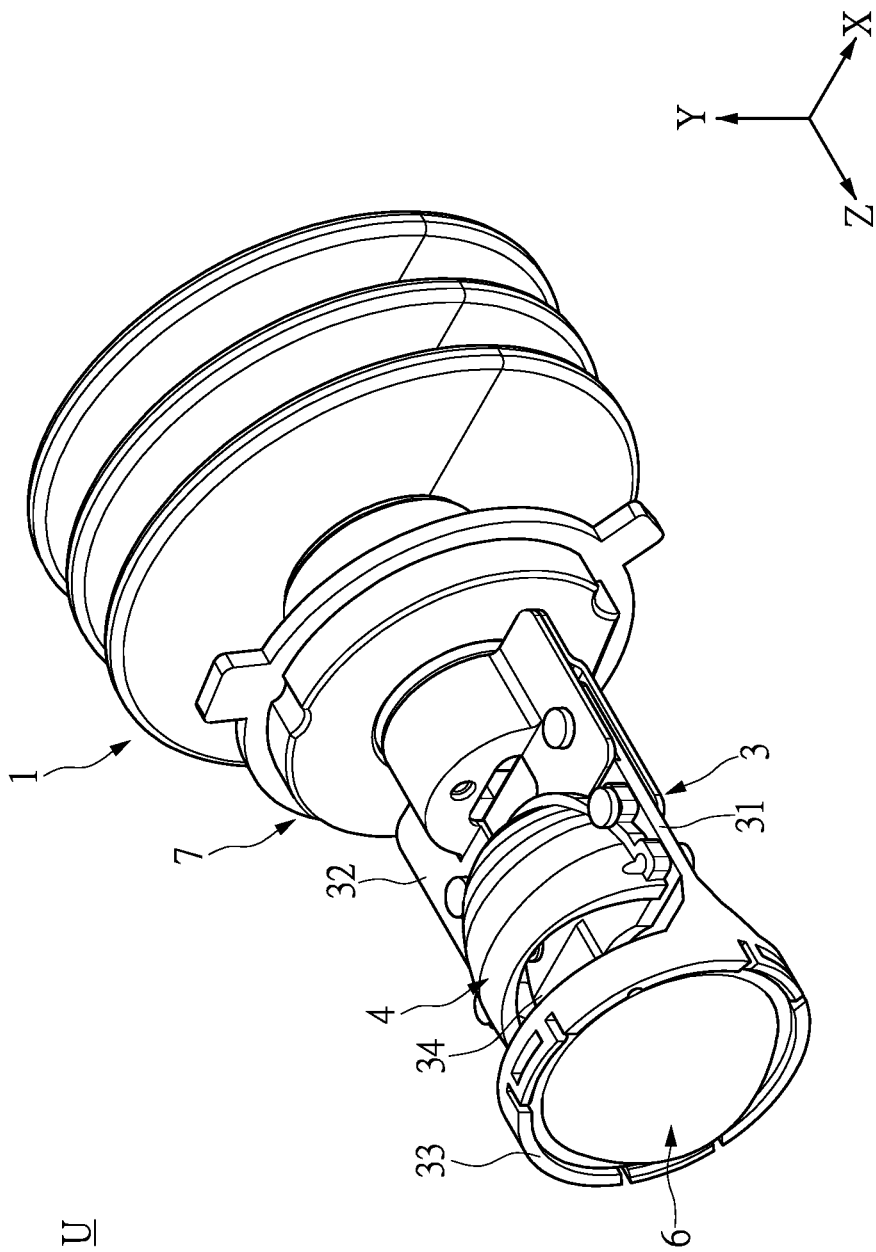
FIG. 1 is an assembled perspective view of a light projection device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 5:
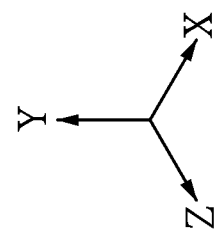
FIG. 5 is a cross-sectional view of the light projection device according to the first embodiment of the present disclosure.
Figure 5:
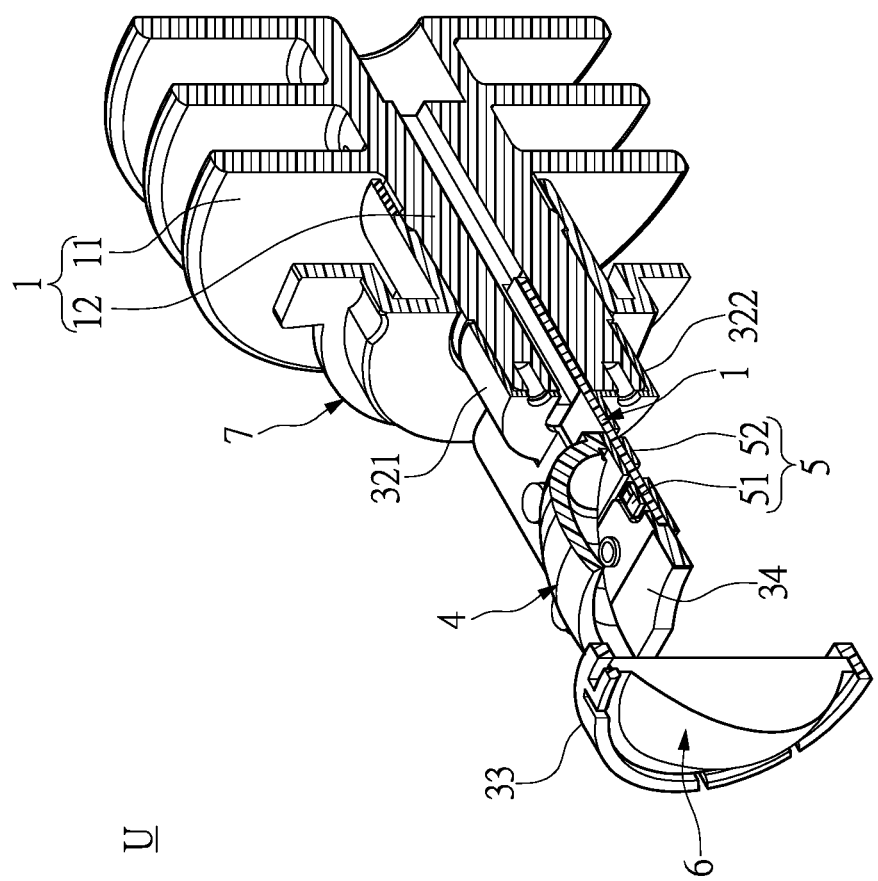
Figure 6:
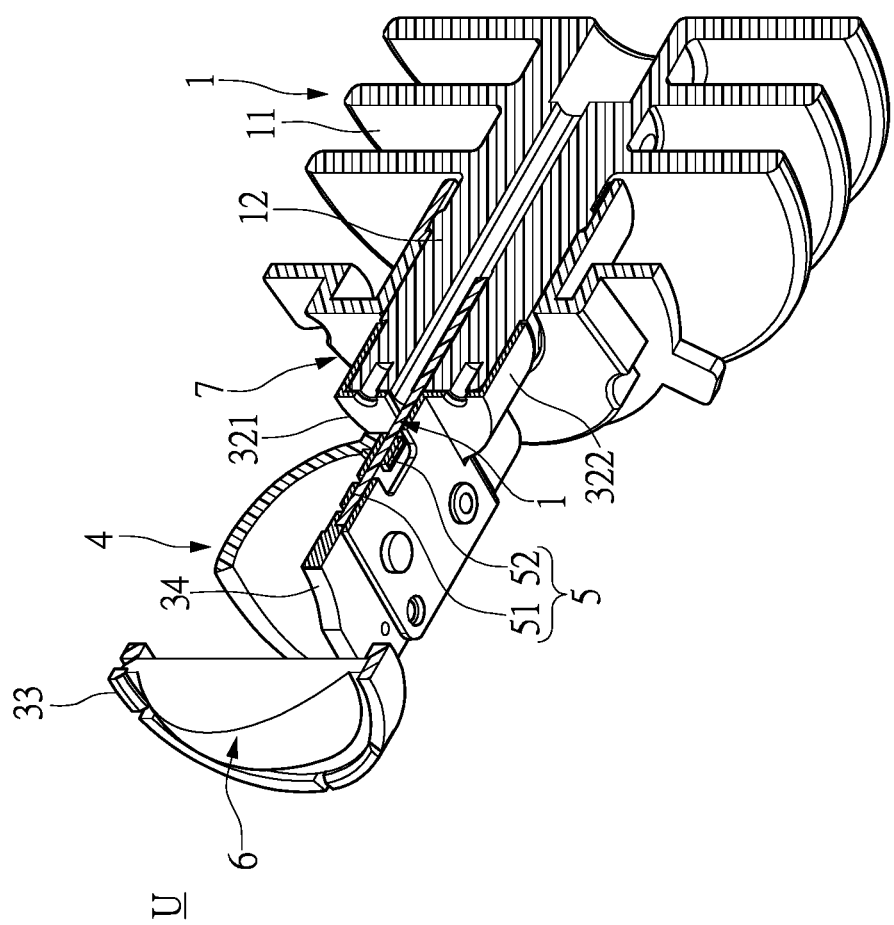
FIG. 6 is another cross-sectional view of the light projection device according to the first embodiment of the present disclosure.

Referring to FIG. 1, FIG. 2, FIG. 5, and FIG. 6, FIG. 1 and FIG. 2 are the assembled perspective views of the light projection module U according to a first embodiment. FIG. 5 and FIG. 6 are the cross-sectional views of the light projection module U according to the first embodiment. The first embodiment of the present disclosure provides a heat dissipation unit 1, a thermal conducting interface unit 2, a holding unit 3, a reflective unit 4, a luminous unit 5, and a lens unit 6.

Figure 8:
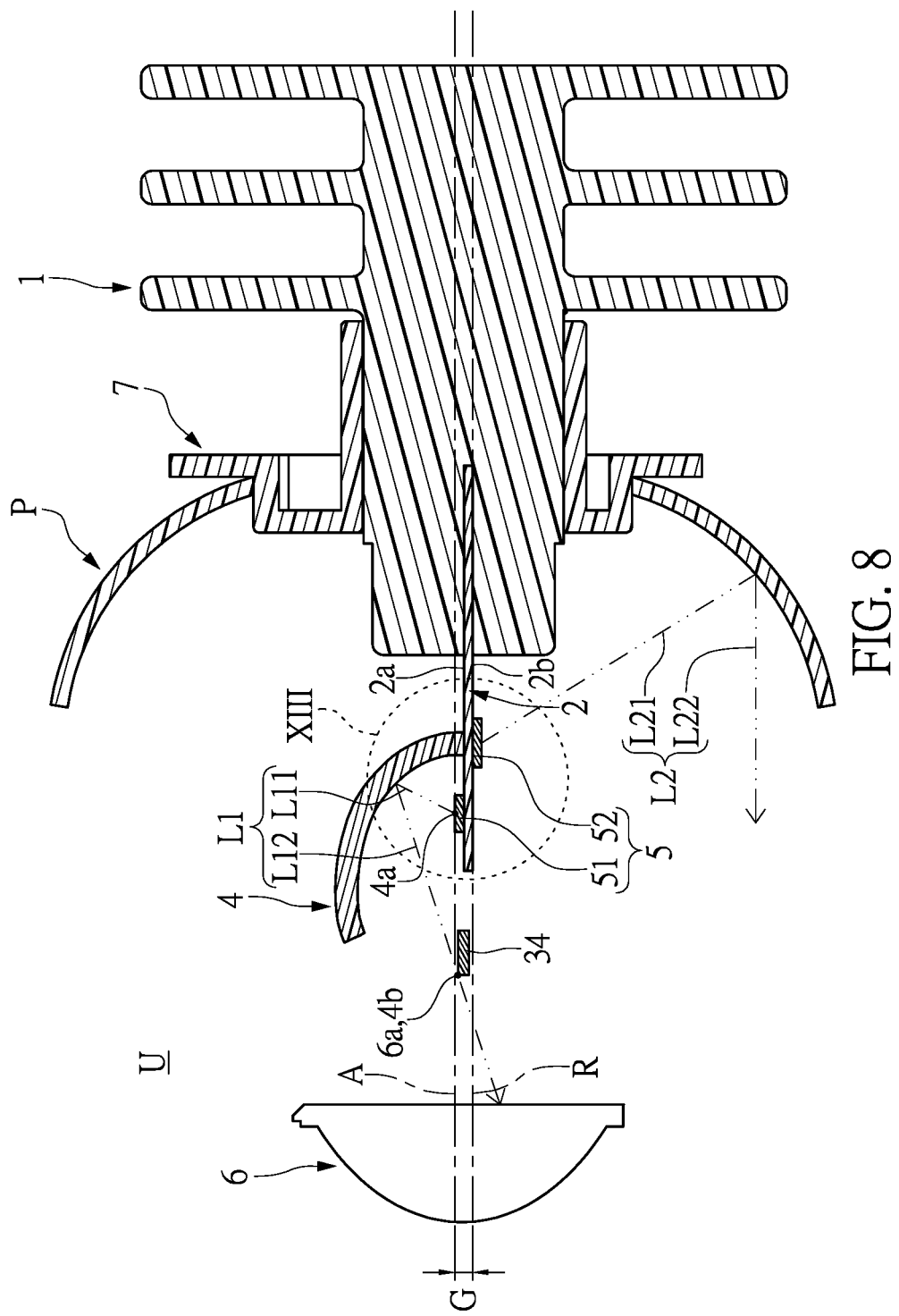
FIG. 8 is a light projection diagram of the light projection device according to the first embodiment of the present disclosure.

For example, the light projection module U can be applied in automobile headlight and can be cooperated with a reflective structure P (as shown in FIG. 8, where the reflective structure P is the existing reflective lamp covers). Further, the light projection module U provided by the present disclosure is suitable for the light sources mentioned in Regulation 37 as prescribed by the United Nations Economic Commission for Europe (abbreviated as ECE R37). The specifications of the light sources include but are not limited to H4, HS1, S1, S2, S3, H1, H7, and H11, which can replace the existing tungsten halogen lamp, halogen lamp, or HID lamp. In other embodiments, the light projection module U provided by the present disclosure may also be suitable for other light sources provided in other automobile headlight regulations. In the present disclosure, the light source H4 is used only for exemplary purposes, and should not be taken as limiting the scope of the present disclosure.

Figure 2:
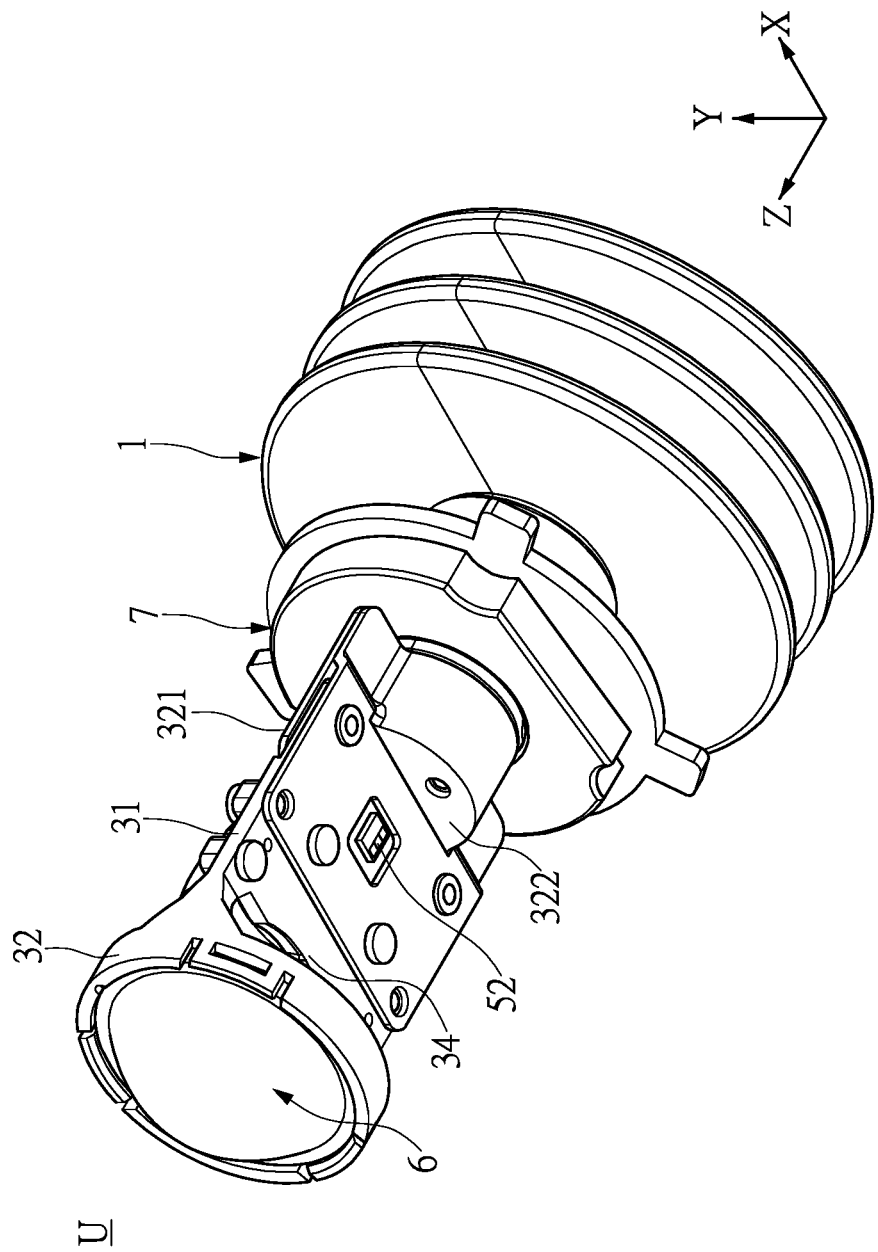
FIG. 2 is another assembled perspective view of the light projection device according to the first embodiment of the present disclosure.
Figure 3:
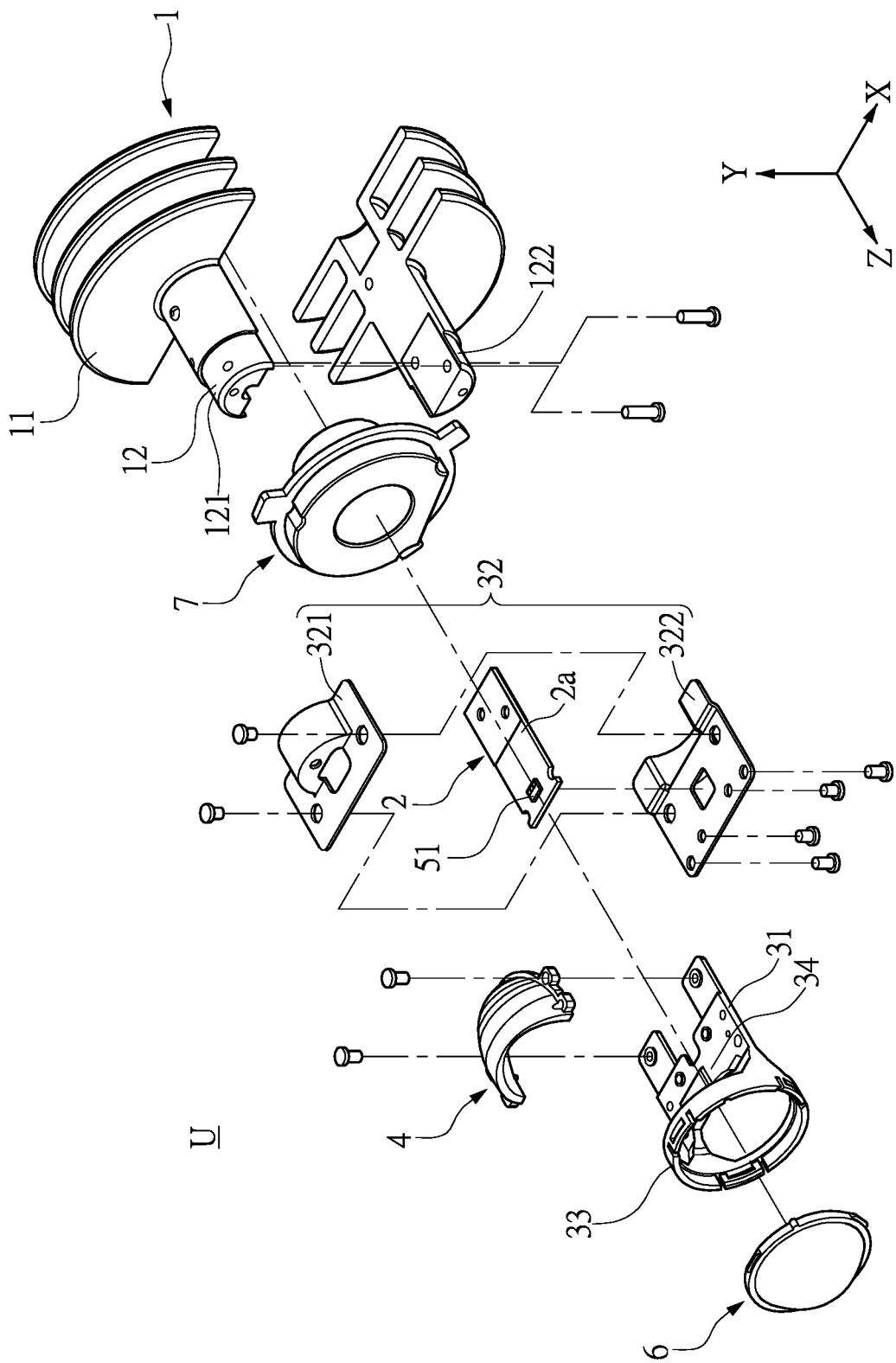
FIG. 3 is an exploded perspective view of the light projection device according to the first embodiment of the present disclosure.
Figure 4:
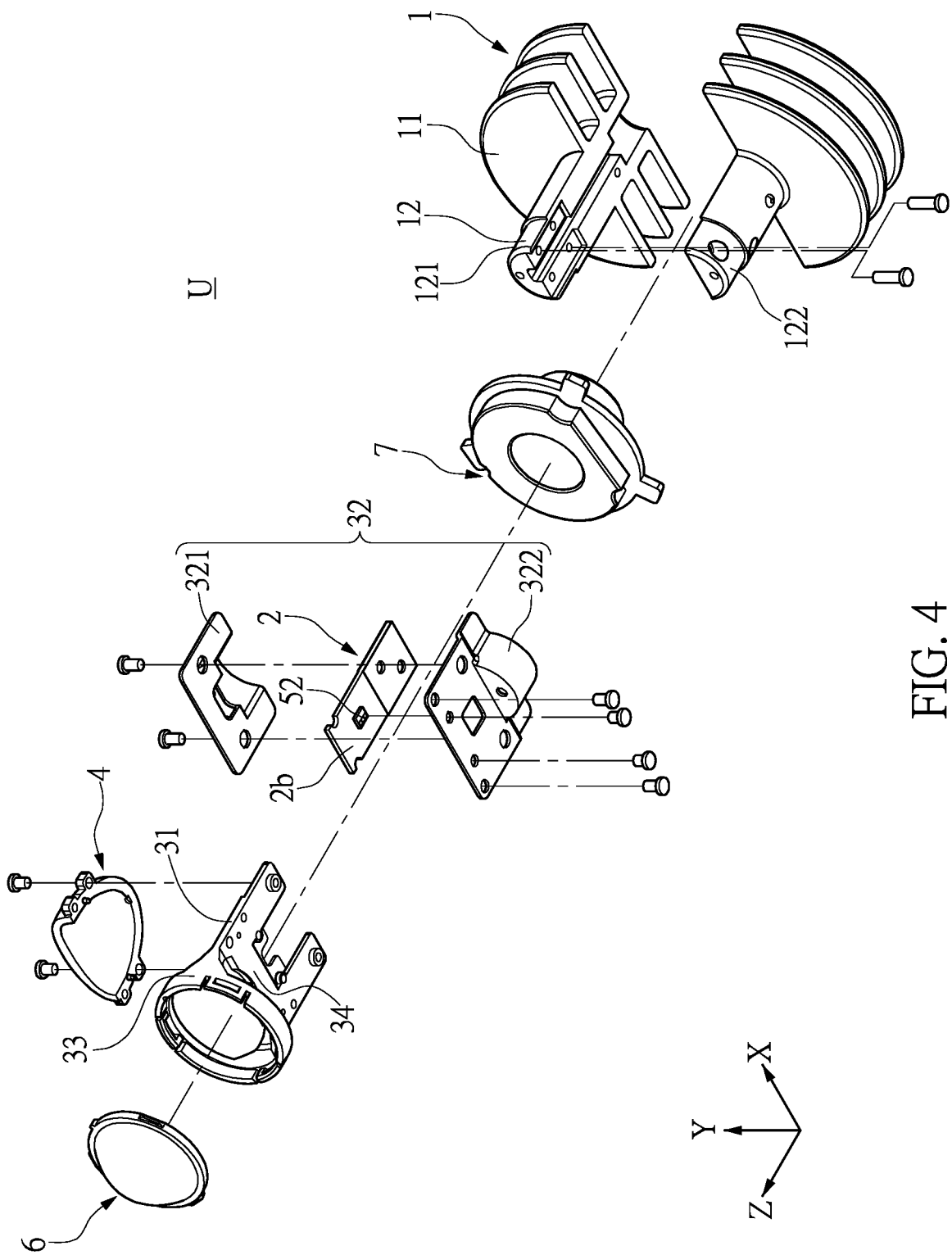
FIG. 4 is another exploded perspective view of the light projection device according to the first embodiment of the present disclosure.

Please refer to FIG. 3 and FIG. 4 in accordance with FIG. 1, FIG. 2, FIG. 5, and FIG. 6. FIG. 3 and FIG. 4 are exploded perspective views of the light projection module U according to the first embodiment. The heat dissipation unit 1 includes a heat dissipation body 11 and a connecting part 12 connected with the heat dissipation body 11. The thermal conducting interface unit 2 is disposed on the connecting part 12 of the heat dissipation unit 1. The thermal conducting interface unit 2 has a first surface 2a and a second surface 2b opposite to the first surface 2a. The connecting part 12 includes a first connecting part 121 and a second connecting part 122 connecting to each other. A part of the thermal conducting interface unit 2 is disposed between the first connecting part 121 and the second connecting part 122. By this configuration, the heat can be transferred from the thermal conducting interface unit 2 to the heat dissipation unit 1.

Preferably, the materials of the thermal conducting interface unit 2 and the holding unit 3 are different. Furthermore, the thermal conductivity of the thermal conducting interface unit 2 is higher than the thermal conductivity of the heat dissipation unit 1 or the thermal conductivity of the holding unit 3. However, the present disclosure is not limited to that disclosed herein.

As mentioned above, the thermal conducting interface unit 2 can be made of a copper-containing metal plate, the heat dissipation unit 1 can be made of an aluminum-containing metal plate, and the holding unit 3 can be made of a steel-containing metal plate, but is not limited thereto. In other embodiments, the thermal conducting interface unit 2 can be a ceramic substrate or other materials. The heat dissipation unit 1 is not restricted to being the aluminum-containing metal plate. The holding unit 3 is not restricted to being the steel-containing metal plate. Specifically, the thermal conducting interface unit 2 is directly disposed on the connecting part 12 of the heat dissipation unit 1 so that the connecting part 12 can act as a heat transfer medium between the thermal conducting interface unit 2 and the heat dissipation unit 1. The heat dissipation body 11 can include a plurality of fins or prisms to dissipate heat, but is not limited thereto. In other embodiments, the thermal conducting interface unit 2 can be a thin heat pipe coated with a conducting layer. The material of the thermal conducting interface unit 2 can be aluminum, silver, gold, or other metals with high thermal conductivity. Similarly, the material of the thermal conducting interface unit 2 can be graphite, graphite composites, or other pipe-shaped, stick-shaped, or plate-shaped materials having high thermal conductivity (including but not limited to heat pipes or loop heat pipes). That is, the thermal conducting property of the thermal conducting interface unit 2 should be better than the thermal conducting properties of the heat dissipation unit 1 and the holding unit 3 in the present disclosure.

In addition, while the thermal conducting coefficient of copper is obviously higher than the thermal conducting coefficient of aluminum, the structural integrity of copper is weaker than the structural integrity of aluminum based on the same thickness. Therefore, by disposing the thermal conducting interface unit 2 and the holding unit 3 on the heat dissipation unit 1 separately and by using different materials to fabricate the thermal conducting interface unit 2 and the holding unit 3, the heat dissipation path structure and the weight loading structure of the light projection device can be separated, the heat dissipation path can be shortened, and the structural integrity can be enhanced. Preferably, the structural integrity of the holding unit 3 is stronger than the structural integrity of the thermal conducting interface unit 2.

Referring to FIG. 1 to FIG. 6, the holding unit 3 is disposed on the connecting part 12 of the heat dissipation unit 1. The holding unit 3 includes a holding body 31, a holding component 32 disposed on the holding body 31 and connected with the heat dissipation unit 1, and a lens holder 33 disposed on the holding body 31.

The holding component 32 includes a first holding plate 321 and a second holding plate 322. One side of the first holding plate 321 and one side of the second holding plate 322 can be concurrently disposed on the connecting part 12 of the heat dissipation unit 1. The other side of the first holding plate 321 and the other side of the second holding plate 322 can be connected with the holding body 31, such as by threaded fixation. In other embodiments, the holding component 32 and the holding body 31 may be formed integrally.

The holding component 32 of the holding unit 3 is directly connected with the connecting part 12 of the heat dissipation unit 1 in order to support the holding unit 3 and the reflective unit 4 disposed on the holding unit 3. That is, the holding component 32 of the holding unit 3 is directly connected with the connecting part 12 of the heat dissipation unit 1, and the holding component 32 is fixed on the connecting part 12 by a screw.

Please refer to FIG. 1 to FIG. 6 in conjunction with FIG. 8. FIG. 8 is a light projection view of the light projection module U. For ease of illustration, only the main components are shown in FIG. 8, for instance, the shielding plate 34 is shown only schematically therein. Specifically, the reflective unit 4 is disposed on the holding body 31. The reflective unit 4 has a first focal point 4a and a second focal point 4b corresponding to the first focal point 4a. For example, the reflective unit 4 is a composite ellipsoidal shell, that is, the reflective unit 4 is a shell including a plurality of ellipsoids with different curvatures or a single ellipsoid.

Further, the luminous unit 5 includes a first luminous structure 51 disposed on the first surface 2a of the thermal conducting interface unit 2 and a second luminous structure 52 disposed on the second surface 2b of the thermal conducting interface unit 2. In the present disclosure, the disposition or even inclusion of the second luminous structure 52 are not limited.

Preferably, the first luminous structure 51 corresponds to the first focal point 4a of the reflective unit 4. For example, the first luminous structure 51 can be disposed on the first focal point 4a of the reflective unit 4 or near the first focal point 4a of the reflective unit 4.

Figure 10:
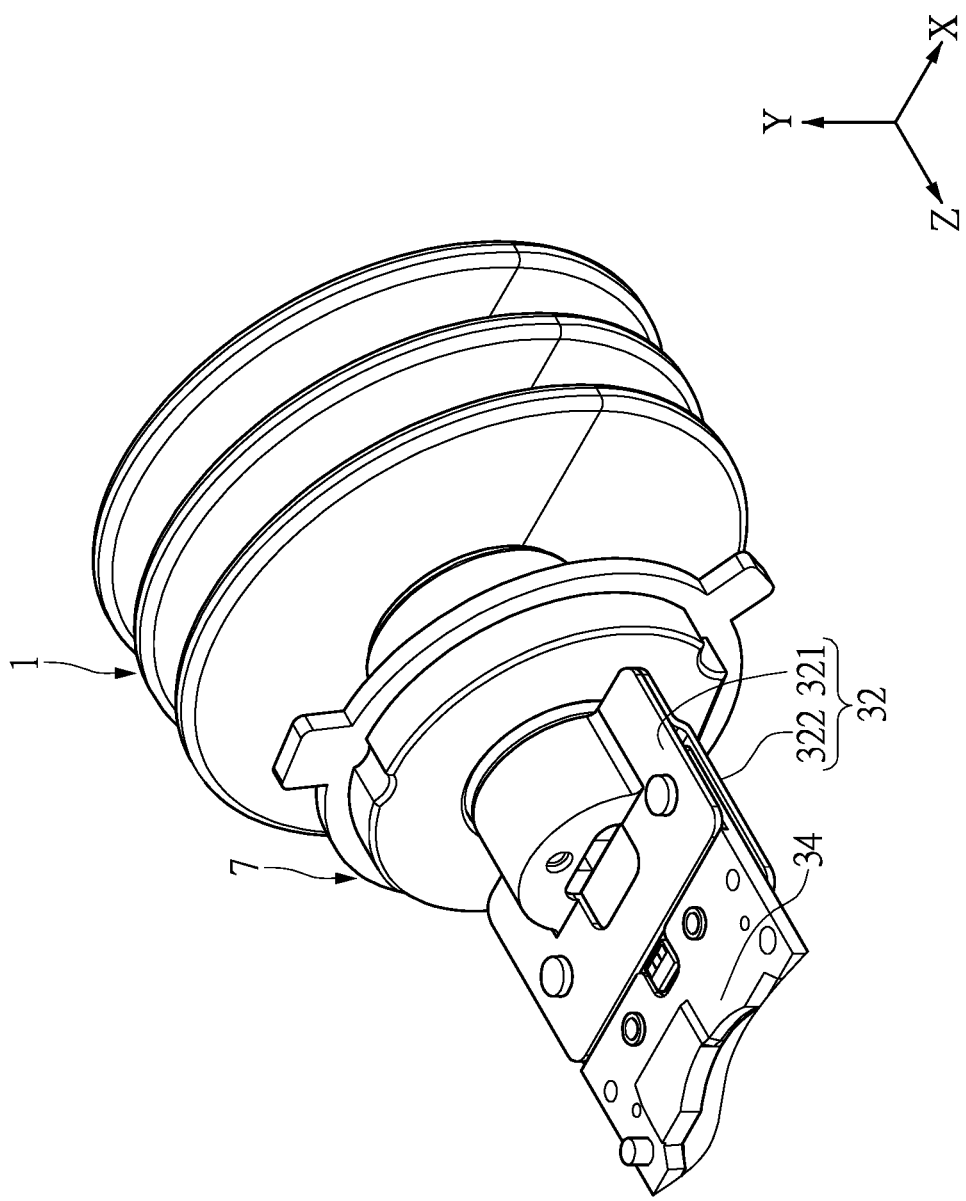
FIG. 10 is an assembled perspective view of a shielding plate disposed on the holding body according to the first embodiment of the present disclosure.

Please refer to FIG. 5 to FIG. 8 and FIG. 10. FIG. 10 is an assembled perspective view of the shielding plate 34 disposed on the holding body 31 according to the first embodiment of the present disclosure. The leading edge of the shielding plate 34 can be roughly divided into a left side and a right side. A gap is formed between the left side and the right side of the leading edge of the shielding plate 34 to produce an asymmetrical cut-off line conforming to automobile headlight regulations. In other embodiments, the leading edge of the shielding plate 34 can also be a straight line to produce a symmetrical cut-off line for vehicles with two wheels. The specific structure and the shape of the shielding plate 34 can be fully understood by the person of ordinary skill in the art so that relevant details will be omitted from the present disclosure.

Specifically, when the first luminous structure 51 is lit, the headlight can produce a low beam. When the first luminous structure 51 and the second luminous structure 52 are both lit, the headlight can produce a high beam. In other embodiments, the second luminous structure 52 can also be lit individually to produce a high beam. In addition, the first luminous structure 51 and the second luminous structure 52 can respectively be a single LED or a packaged LED containing many LEDs, but is not limited thereto.

Referring to FIG. 1 to FIG. 6, the lens unit 6 is disposed on the holding unit 3. The lens unit 6 has an optical axis A and a lens focal point 6a on the optical axis A. The lens focal point 6a corresponds to the second focal point 4b of the reflective unit 4. For example, the lens focal point 6a can overlap with the second focal point 4b of the reflective unit 4 or be near the second focal point 4b of the reflective unit 4. Furthermore, the lens unit 6 can be a plane-convex lens, a double-convex lens, or a meniscus lens. Preferably, the light will be emitted from the convex part of the lens unit 6.

Referring to FIG. 1 to FIG. 6, the holding unit 3 can further include the shielding plate 34 which is disposed on the holding body 31. A first light produced by the first luminous structure 51 can be appropriately shielded off by the shield plate 34 and projected to form a light having a cut-off line. Further, the shielding plate 37 can be a cut-off plate. That is, the light passing through the shielding plate 37 can have a cut-off line and meet the requirement of low beam in automobile headlight regulations.

In the first embodiment, the thermal conducting interface unit 2 and the holding unit 3 are respectively disposed on the heat dissipation unit 1 to form a heat dissipation path structure and a weight loading structure. In order to increase the thermal conductivity and the structural integrity of the thermal conducting interface unit 2, the thermal conducting interface unit 2 can abut against or contact the holding unit 3. Thereby, the heat conducting efficiency of the holding unit 3 and the structural integrity of the thermal conducting interface unit 2 can be increased, and the holding unit 3 can protect the thermal conducting interface unit 2. That is, referring to FIG. 5 and FIG. 6, trenches (not shown in the figure) are formed on a surface of the holding body 31 of the holding unit 3 opposite to the first surface 2a and opposite to the second surface 2b of the thermal conducting interface unit 2 to accommodate the first luminous structure 51 and the second luminous structure 52.

Referring to FIG. 1 to FIG. 6, the light projection module U can further include a base unit 7. The base unit 7 is located on the connecting part 12 of the heat dissipation unit 1 so that the light projection module U can be installed on the automobile. Specifically, the base unit 7 conforms to automobile headlight regulations. Therefore, the light projection module U can be installed on the automobile via the base unit 7 to replace the existing tungsten halogen lamp, halogen lamp, or HID lamp without changing the original structure of the headlight.

Figure 7:
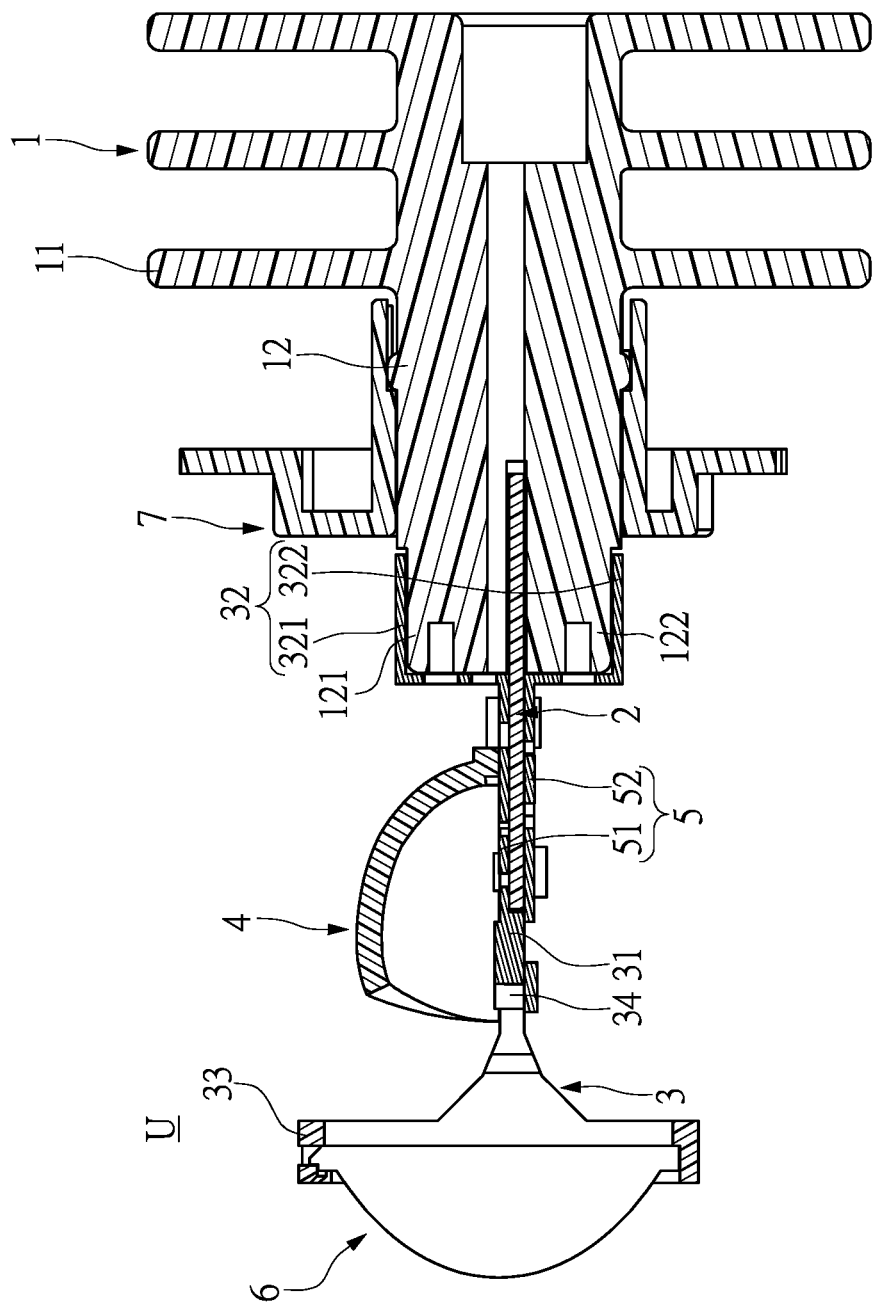
FIG. 7 is a side cross-sectional view taken along line XII-XII of FIG. 1.

Please refer to FIG. 7 and FIG. 8. FIG. 7 is a side cross-sectional view taken along line XII-XII of FIG. 1. For example, in FIG. 7 and FIG. 8, the first surface 2a and the second surface 2b of the thermal conducting interface unit 2 are substantially parallel to each other. The base unit 7 has a referenced axis R near the optical axis A of the lens unit 6. A predetermined distance G between the referenced axis R of the base unit 7 and the optical axis A of the lens unit 6 is 0 mm to 10 mm. The referenced axis R is substantially parallel to the optical axis A. For example, the referenced axis R of the base unit 7 is also the center line of the base unit 7, that is, the referenced axis R is equal to the reference axis of the headlight with light source H4. In the FIG. 8, the holding unit 3 is not shown for ease of comprehension.

Referring to FIG. 8, a first light L1 produced by the first luminous structure 51 includes a first projected light L11 emitting toward the reflective unit 4. Then, the first projected light L11 is reflected by the reflective unit 4 and forms a first reflected light L12. The first reflected light L12 passes through the second focal point 4b of the reflective unit 4, so that the first reflected light L12 produced by the first luminous structure 51 can project to the lens unit 6 and form a low beam conforming to automobile headlight regulations. In addition, when the light projection module U and a reflective structure P (not shown in figure) of headlight devices are disposed correspondingly, the second light L2 produced by the second luminous structure 52 includes a second projected light L21 toward the reflective structure P. The second projected light L21 is reflected by the reflective structure P and forms a second reflected light L22. Meanwhile, the first reflected light L12 and the second reflected light L22 can superpose and produce the high beam conforming to automobile headlight regulations. In FIG. 8, the first projected light L11 and the second projected light L21 are roughly emitted toward opposite directions, but are not limited thereto.

Figure 9:
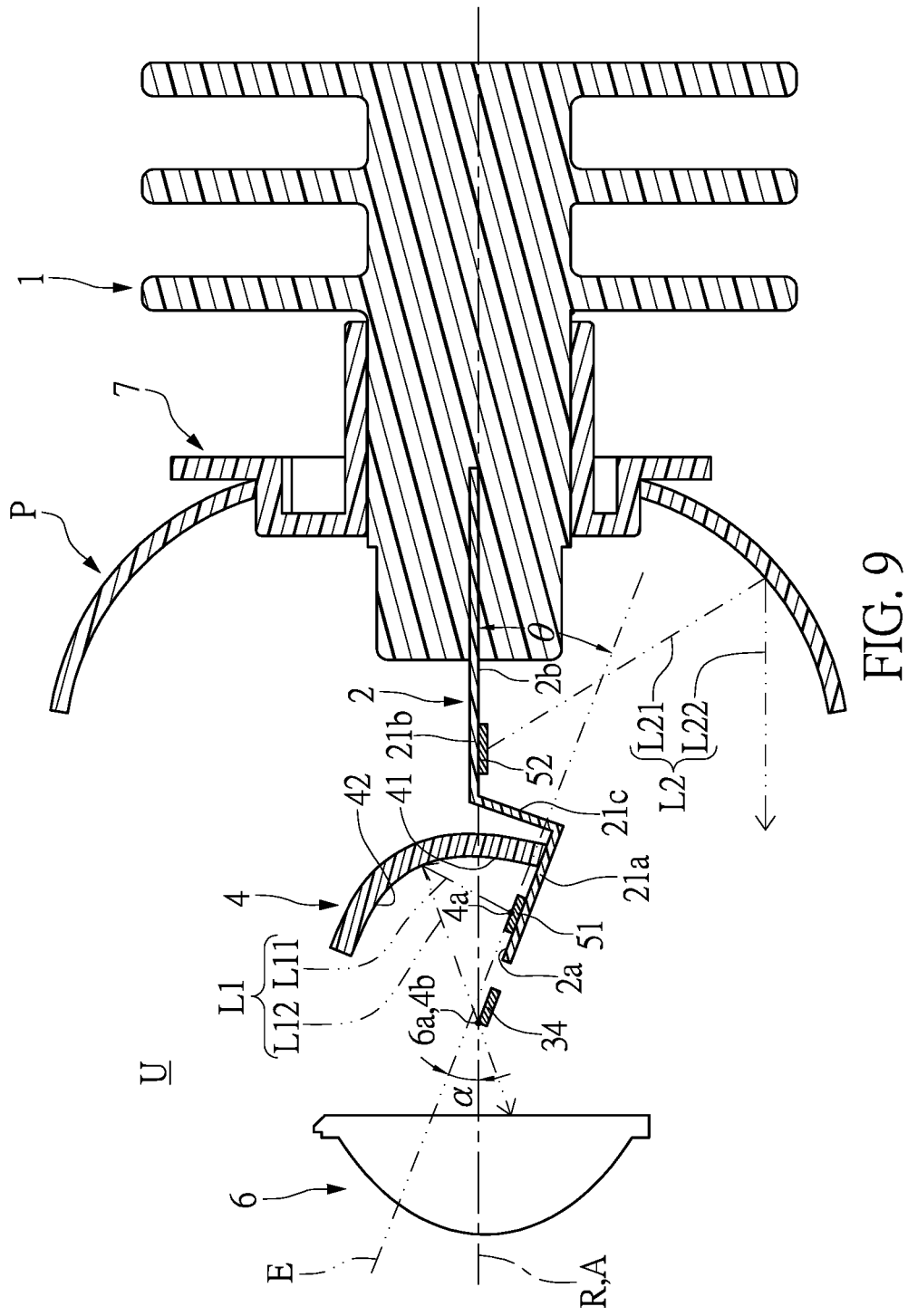
FIG. 9 is another light projection diagram of the light projection device according to the first embodiment of the present disclosure.

Referring to FIG. 9, FIG. 9 is another light projection diagram of the light projection device according to the first embodiment of the present disclosure. For ease of illustration, only the main components are shown in FIG. 9 and the shielding plate 34 is shown only schematically therein, while other components in FIG. 9 are similar to those previously described.

Comparing FIG. 9 with FIG. 8, the difference between the embodiments is that the thermal conducting interface body 21 of the thermal conducting interface unit 2 in FIG. 9 has a stepped structure. That is, the thermal conducting interface body 21 of the thermal conducting interface unit 2 is not a flat plate, but has a deflection angle.

Specifically, referring to FIG. 9, the thermal conducting interface unit 2 includes a thermal conducting interface body 21. The thermal conducting interface body 21 has a first plate 21a, a second plate 21b, and a connecting plate 21c connected between the first plate 21a and the second plate 21b. The first surface 2a of the first plate 21a and the second surface 2b of the second plate 21b have a predetermined angle θ ranging from 1° to 30°.

The specific structure of the holding unit 3 is not shown in FIG. 9 but the holding unit 3 is similar to that in the previous embodiment or has a stepped structure like the thermal conductor interface body 31. Thereby, the reflective unit 4 can be disposed on the holding body 31 of the holding unit 3 and the first luminous structure unit 51 corresponds to the first focal point 4a of the reflective unit 4. Further, the holding unit 3 includes a holding body 31, a holding component 32 disposed on the holding body 31 and connecting to the thermal dissipation unit 1, and a lens holder 33 disposed on the holding body 31. The reflective unit 4 can be disposed on the holding body 31. The lens unit 6 can be disposed on the lens holder 33.

As showed in FIG. 9, the second surface 2b of the second plate 21b is substantially parallel to the optical axis A. The first luminous structure 51 is disposed on the first surface 2a of the first plate 21a. The second luminous structure 52 is disposed on the second surface 2b of the second plate 21b. The disposition of the first luminous structure 51 and the second luminous structure 52 are not limited to that disclosed herein. In FIG. 9, the luminous surface of the first luminous structure 51 and the luminous surface of the second luminous structure 52 can be disposed on the same side relative to the referenced axis R of the base unit 7. That is, the first luminous structure 51 is disposed below the optical axis A. Specifically, the location of the luminous surface of the first luminous structure 51 corresponds to the first focal point 4a of the reflective unit 4. Preferably, an extended surface of the luminous surface of the first luminous structure 51 is near or even overlaps the second focal point 4b.

In FIG. 9, the reflective unit 4 corresponds to the first luminous structure 51. A line E linking the first focal point 4a of the reflective unit 4 and the second focal point 4b of the reflective unit 4 is inclined relative to the optical axis A. The line E and the optical axis A has a preset angle α ranging from 0 degrees to 30 degrees.

As stated above, the referenced axis R can overlap with the optical axis A or partially overlap with the optical axis A. The reflective unit 4 includes a first reflective surface 41 and a second reflective surface 42 connecting to the first reflective surface 41. The first reflective surface 41 and the second reflective surface 42 are respectively located on different sides of the optical axis A in FIG. 9. The first reflective surface 41 and the second reflective surface 42 are each formed of ellipsoidal curves. The curvature of the first reflective surfaces 41 and the curvature of the second reflective surface 42 can be the same or different. When the curvature of the first reflective surface 41 and the curvature of the second reflective surface 42 are the same, the first focal point (not numbered but being equal to the first focal point 4a in FIG. 9) of the first reflective surface 41 will overlap with the first focal point (not numbered but being equal to the first focal point 4a in FIG. 9) of the second reflective surface 42 and both corresponding to the first luminous structure 51. In addition, the second focal point (not numbered but being equal to the second focal point 4b in FIG. 9) of the first reflective surface 41 will overlap with the second focal point (not numbered but being equal to the second focal point 4b in FIG. 9) of the second reflective surface 42, and both correspond to the optical focal point 6a.

When the curvature of the first reflective surface 41 and the curvature of the second reflective surface 42 are different, the first reflective surface 41 can act as a reflective lamp cup that produces a concentrated light pattern and the second reflective surface 42 can act as a reflective lamp cover that produces a scattered light pattern. In other words, the first reflective surface 41 can be a hotspot of the full light pattern and the second reflective surface 42 can be a non-hotspot of the full light pattern. That is, as the first focal point 4a of the first reflective surface 41 does not overlap with the first luminous structure 51 or is only near the first luminous structure 51, the second reflective surface 42 can disperse the light produced by the first luminous structure 51 and produce dispersed illumination.

Second Embodiment

Figure 11:
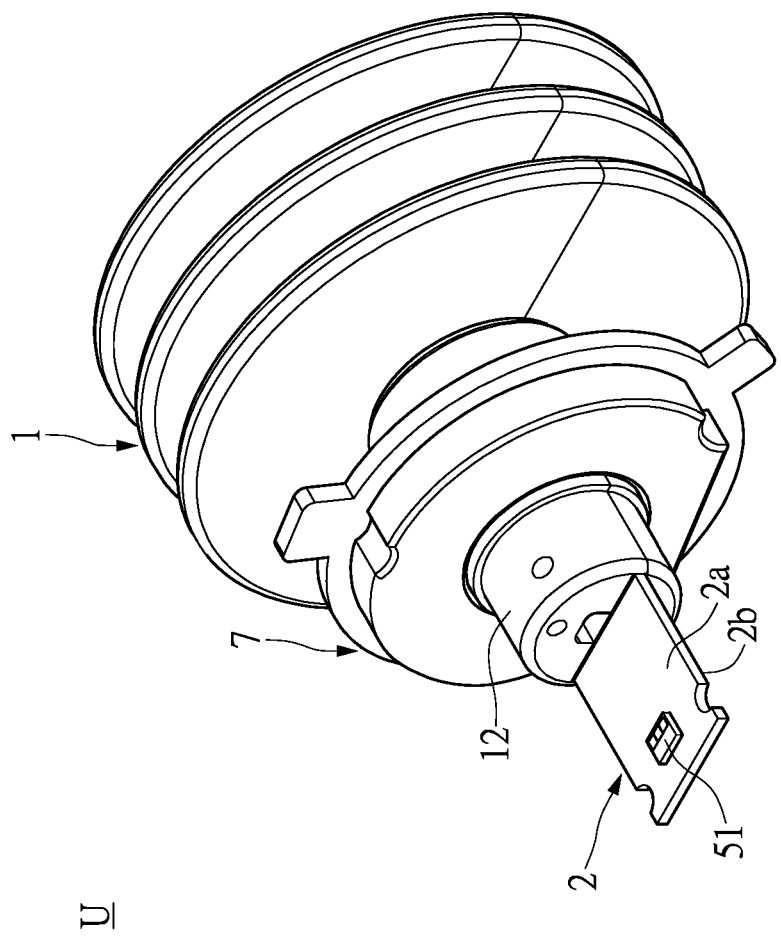
FIG. 11 is an assembled perspective view of the light projection device according to a second embodiment of the present disclosure.
Figure 12:
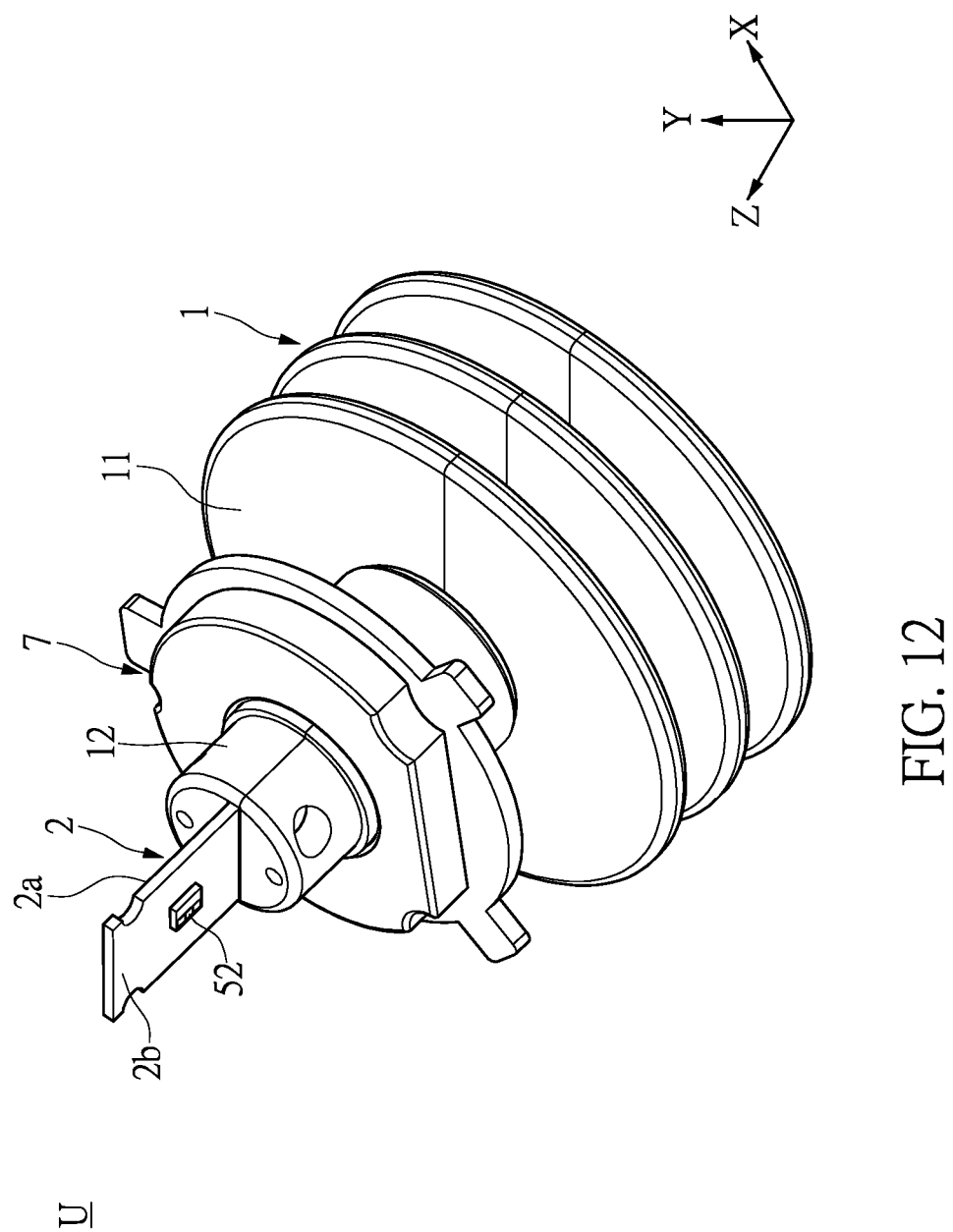
FIG. 12 is another assembled perspective view of the light projection device according to the second embodiment of the present disclosure.

Please refer to FIG. 11 and FIG. 12. FIG. 11 and FIG. 12 are assembled perspectives of the light projection device according to a second embodiment of the present disclosure. Comparing FIG. 11 and FIG. 12 with FIG. 1 to FIG. 4, the difference between the first embodiment and the second embodiment is that: the light projection module U of the second embodiment can produce light conforming to the regulations by arranging the disposition of the first luminous structure 51 and the second luminous structure 52 without having to include the lens unit 6 and the holding unit 3. In FIG. 11 and FIG. 12, the light projection module U includes a heat dissipation unit 1, a thermal conducting interface unit 2, a luminous unit 5, and a base unit 7. The components of the second embodiment are similar to those in the first embodiment. Similarly, the implementation of the second embodiment can also be applied to the first embodiment.

Figure 13:
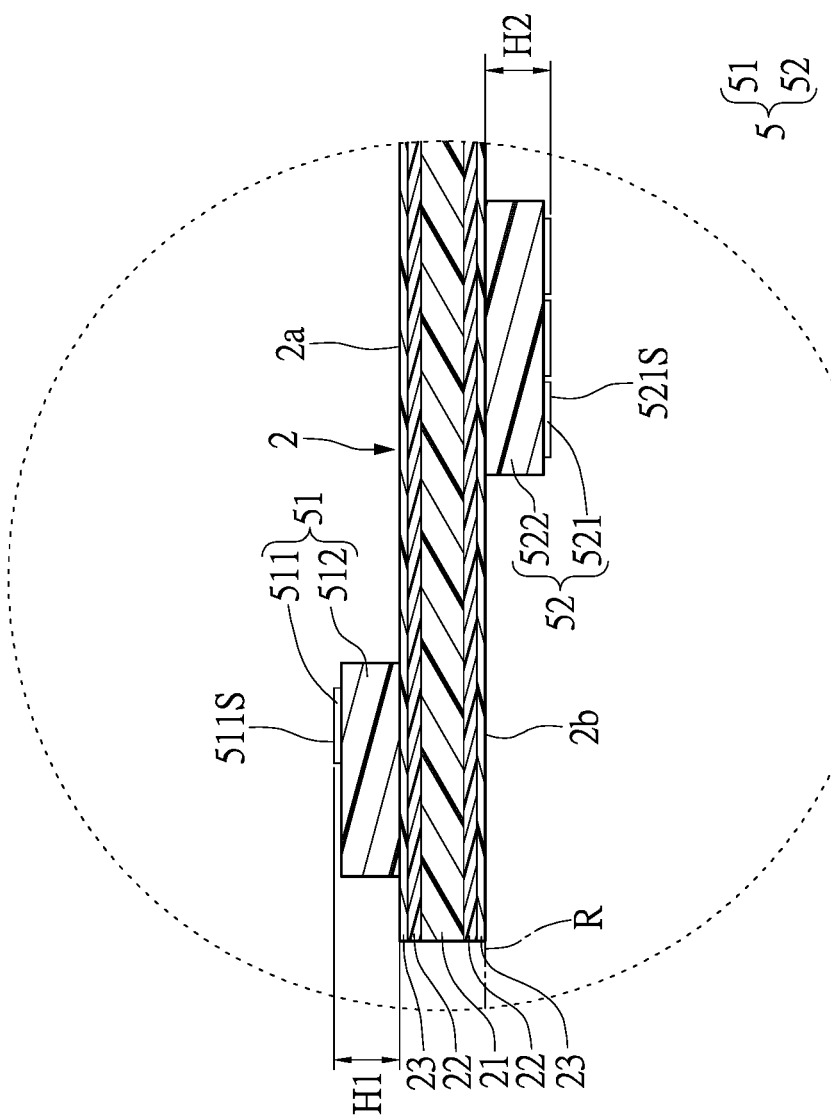
FIG. 13 is a partial enlarged view of section XIII of FIG. 8.

Please refer to FIG. 13. FIG. 13 is a partial enlarged view of section XIII of FIG. 8 without the reflective unit 4. Specifically, the thermal conducting interface unit 2 includes a thermal conducting interface body 21, an insulating layer 22 (also referred to as a dielectric layer) disposed at two opposite sides of the thermal conducting interface body 21, and a conducting layer 23 disposed at the two opposite sides of the thermal conducting interface body 21 and on the insulating layer 22. In other words, the thermal conducting interface unit 2 is a bilateral single layer structure. The conducting layer 23 has a first surface 2a and a second surface 2b which are respectively on the opposite sides of the thermal conducting interface body 21 and exposed to the exterior environment. The first luminous structure 51 and the second luminous structure 52 are respectively located on the first surface 2a and the second surface 2b. The thermal conducting interface unit 2 in the second embodiment of the present disclosure is the bilateral single layer structure, but it is not restricted the present disclosure. In other embodiments of the present disclosure, the thermal conducting interface unit 2 can be a bilateral double layer structure by soldering two copper substrates together.

The first luminous structure 51 includes a substrate 512 and a luminous chip 511 disposed on the substrate 512. The second luminous structure 52 includes a substrate 522 and a luminous chip 521 disposed on the substrate 522. The luminous chip 511 of the first luminous structure 51 is electrically connected to the conducting layer 23 located on one side of the thermal conducting interface body 21. The luminous chip 521 of the second luminous structure 52 is electrically connected to the conducting layer 23 located on the other side of the thermal conducting interface body 21. For example, the substrate 512, 522 can be a ceramic substrate (such as but not limited to aluminum oxide). Therefore, the heat can be transferred from the luminous chip 511, 521, through the substrate 512, 522 and the thermal conducting interface unit 2, and finally reach the heat dissipation unit 1.

The conducting layer 23 can be made of common conducting materials, such as copper, aluminum, silver, or gold. The insulating layer 22 can be made of insulating materials to electrically isolate the thermal conducting interface body 21 and the conducting layer 23. The thermal conducting interface body 21 can be made of material with high thermal conductivity. The material of the thermal conducting interface body 21 and the material of the conducting layer 23 can be the same or different. Preferably, the thermal conductivity of the thermal conducting interface body 21 and the thermal conductivity of the conducting layer 23 are the same, substantially equal, or even higher. For example, the material of the thermal conducting interface body 21 can be copper, aluminum, silver, gold, or other metals with high thermal conductivity. At the same time, the material of the thermal conducting interface unit 2 can be graphite, graphite composites, or other pipe-shaped, stick-shaped, or plate-shaped material having high thermal conductivity (including but not limited to heat pipes or loop heat pipes).

Figure 14:
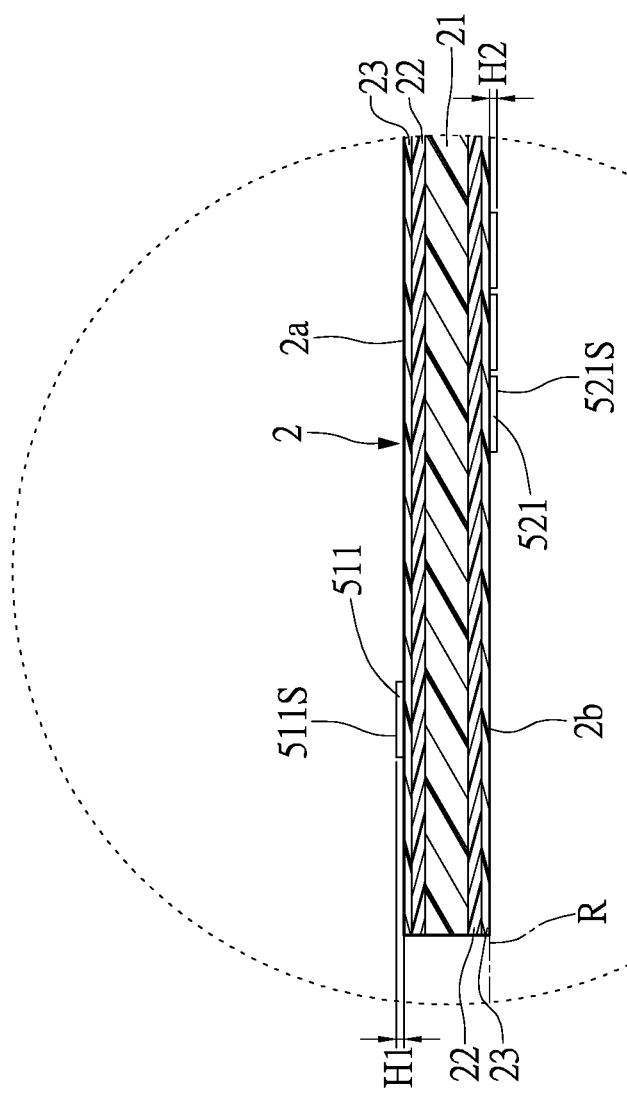
FIG. 14 is a schematic view of the light projection device of FIG. 12 in another configuration.

Referring to FIG. 14 and compared with FIG. 13, the first luminous structure 51 and the second luminous structure 52 in FIG. 14 are different from those in FIG. 13. Specifically, the first luminous structure 51 and the second luminous structure 52 do not have the substrate 512, 522, so that the luminous chip (511, 521) is directly disposed on the thermal conducting interface unit 2. That is, the first luminous structure 51 has a luminous chip 511 electrically connected to the conducting layer 23 on one side of the thermal conducting interface body 21. The second luminous structure 52 has a luminous chip 521 electrically connected to the conducting layer 23 on the other side of the thermal conducting interface body 21. Therefore, the heat dissipation path in FIG. 14 goes through the luminous chip 511, 512, the thermal conducting interface unit 2, and the heat dissipation unit 1.

Referring to FIG. 11 and FIG. 12, in an embodiment without the lens unit 6, the referenced axis R of the base unit 7 can be located between the luminous surface 511S of the first luminous structure 51 and the luminous surface 521S of the second luminous structure 52. A first gap distance H1 between the luminous surface 511S of the first luminous structure 51 and the referenced axis R is smaller than 2 mm. A second gap distance H2 between the luminous surface 521S of the second luminous structure 52 and the referenced axis R is smaller than 2 mm. Preferably, the first gap distance H1 is smaller than 1.3 mm, more preferably, the first gap distance H1 is smaller than 0.5 mm. Preferably, the second gap distance H2 is smaller than 1.64 mm, more preferably, the second gap distance H2 is smaller than 0.82 mm.

Referring to FIG. 1 and FIG. 2, in an embodiment having the lens unit 6, the first gap distance H1 between the luminous surface 511S of the first luminous structure 51 and the referenced axis R is smaller than 10 mm. The second gap distance H2 between the luminous surface 521S of the second luminous structure 52 and the referenced axis R is smaller than 2 mm. Preferably, the first gap distance H1 is smaller than 8 mm. More preferably, the first gap distance H1 is smaller than 2 mm. Furthermore, preferably, the second gap distance H2 is smaller than 1.64 mm. More preferably, the second gap distance H2 is smaller than 0.82 mm.

Referring to FIG. 5 to FIG. 7, the thickness of the holding unit 3 near to the lens unit 6 is smaller than quadruple distance between the luminous surface 511S of the first luminous structure 51 and the luminous surface 521S of the second luminous structure 52. Preferably, the thickness of the holding unit 3 near the lens unit 6 is smaller than double the distance between the luminous surface 511S of the first luminous structure 51 and the luminous surface 521S of the second luminous structure 52. More preferably, the thickness of the holding unit 3 near the lens unit 6 is the same as the distance between the luminous surface 511S of the first luminous structure 51 and the luminous surface 521S of the second luminous structure 52. Further, the thickness of the holding unit 3 near the lens unit 6 is smaller than the distance between the luminous surface 511S of the first luminous structure 51 and the luminous surface 521S of the second luminous structure 52.

Referring to FIG. 11 to FIG. 14, the first luminous structure 51 and the second luminous structure 52 can be packaged with a plurality of luminous chips. In other embodiments, a colloid can be disposed between the two luminous chips to make the light project from the top of the luminous surface 511S of the first luminous structure 51 and the top of the luminous surface 521S of the second luminous structure 52.

Third Embodiment

Figure 15:
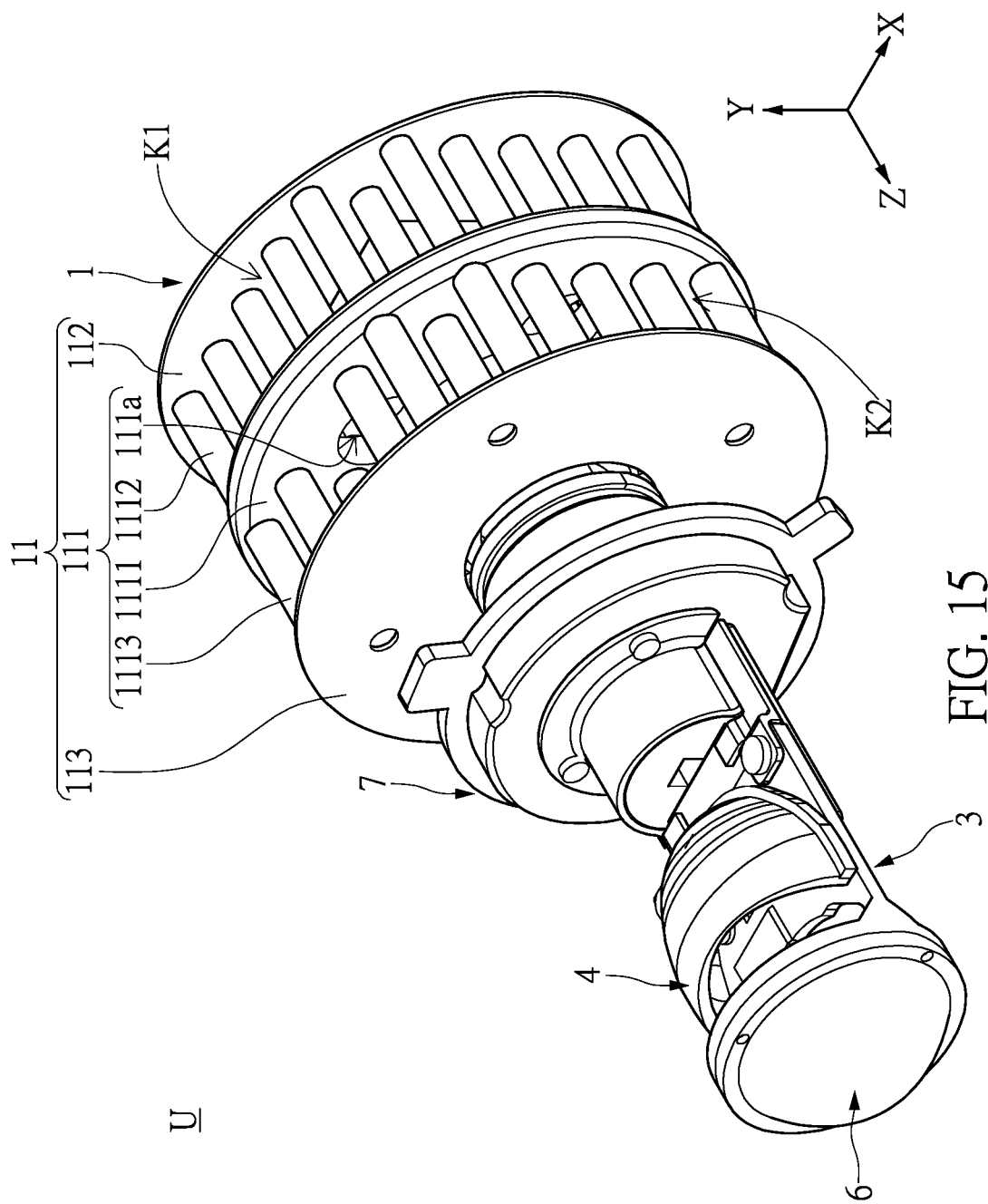
FIG. 15 is an assembled perspective view of the light projection device according to a third embodiment of the present disclosure.
Figure 16:
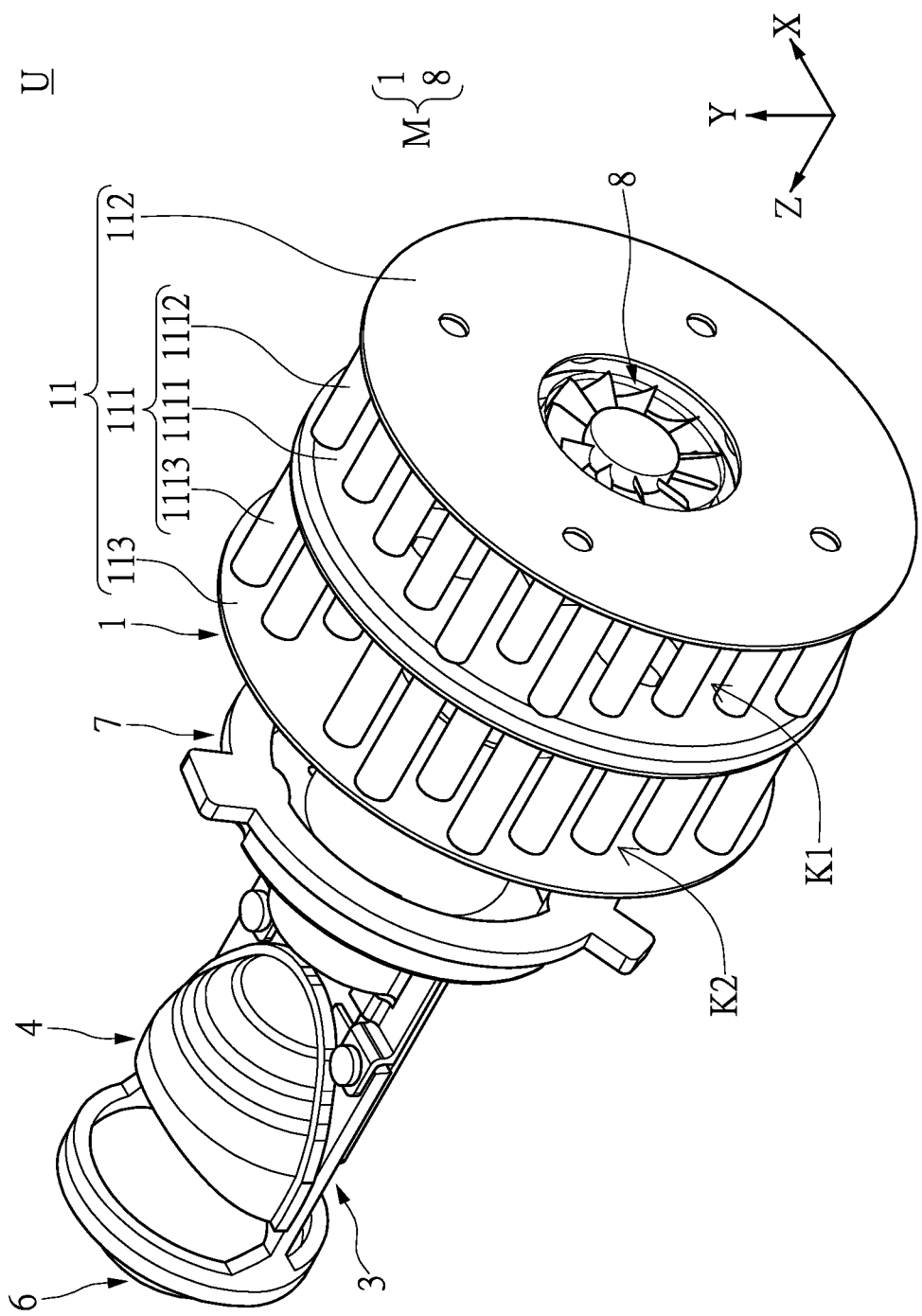
FIG. 16 is another assembled perspective view of the light projection device according to the third embodiment of the present disclosure.
Figure 17:
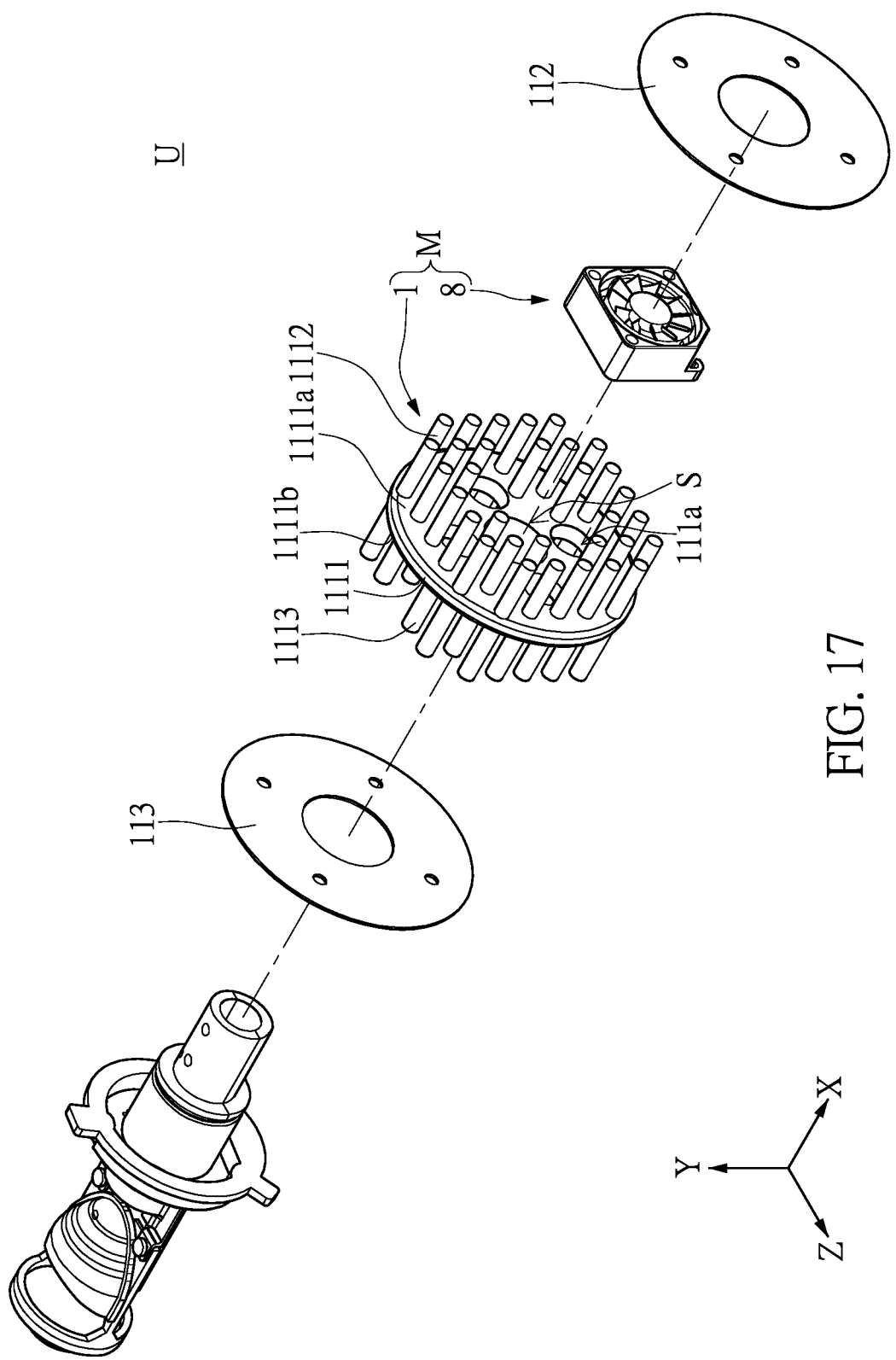
FIG. 17 is a partially exploded perspective view of the light projection device according to the third embodiment of the present disclosure.

Please refer to FIG. 15 to FIG. 17. FIG. 15 and FIG. 16 are assembled perspective views of the light projection module U according to a third embodiment of the present disclosure. FIG. 17 is a partially exploded perspective view of the light projection module U according to the third embodiment of the present disclosure. Comparing FIG. 15 and FIG. 16 with FIG. 1 and FIG. 2, the difference between the third embodiment and the first embodiment is that: the third embodiment provides a heat dissipation module M disposed on the light projection module U. The heat dissipation module M includes a heat dissipation unit 1 and a fan unit 8. The heat dissipation unit 1 has a heat dissipation body 11 and a connecting part 12 being connected with the heat dissipation body 11. The fan unit 8 is disposed on the heat dissipation unit 1. Other components in the third embodiment are similar to those in the first embodiment.

Referring to FIG. 15 to FIG. 17, the heat dissipation body 11 includes a heat conducting body 111, a first deflector 112 disposed on one side of the heat conducting body 111, and a second deflector 113 disposed on the other side of the heat conducting body 111. The heat conducting body 111 includes a main body 1111, a plurality of first extended parts 1112, and a plurality of second extended parts 1113. The main body 1111 has a first surface 1111a and a second surface 1111b opposite to each other. The first extended parts 1112 are disposed on the first surface 1111a of the main body 1111 and located between the main body 1111 and the first deflector 112. The second extended parts 1113 are disposed on the second surface 1111b of the main body 1111 and located between the main body 1111 and the second deflector 113. For example, the first extended parts 1112 and the second extended parts 1113 can be, but not limited to being, column-shaped or plate-shaped heat-dissipating objects.

Figure 19:
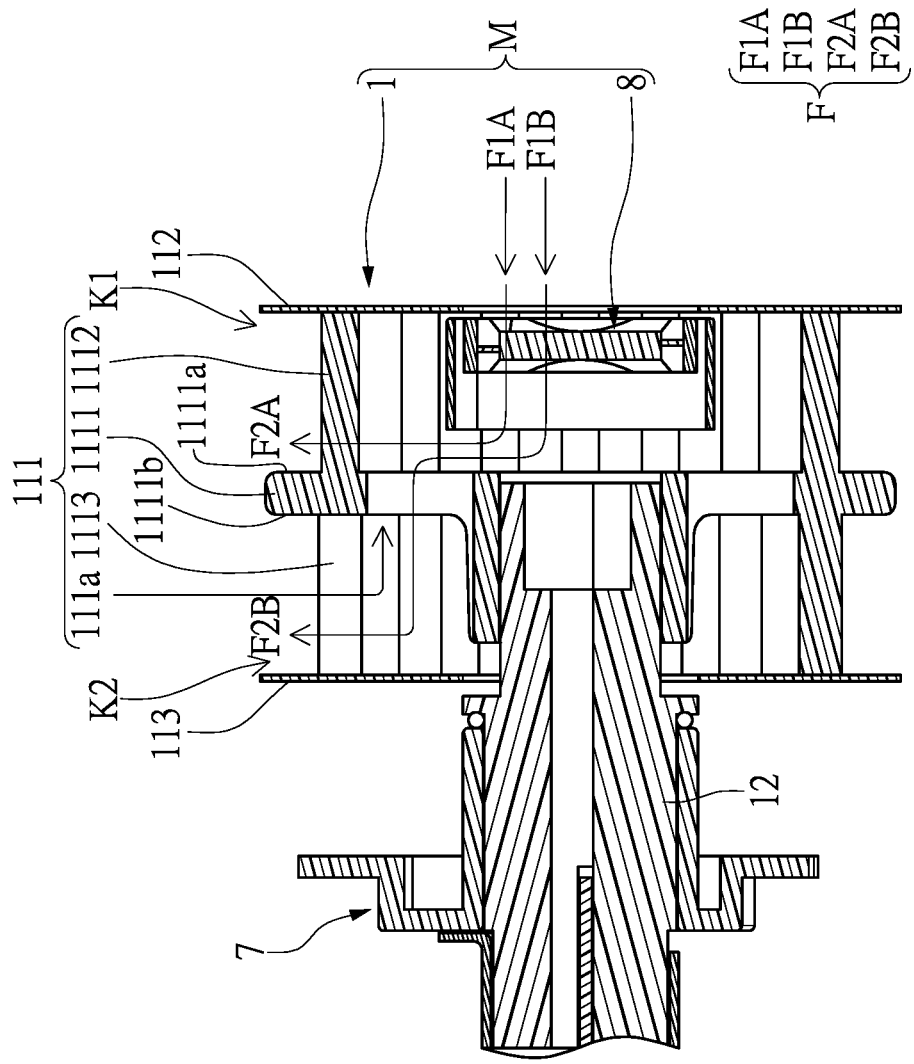
FIG. 19 is a side cross-sectional view of an air current flowing in the heat dissipation unit according to the third embodiment of the present disclosure.

In FIG. 17, an accommodation space S is formed between the first deflector 112 and the thermal conductor 111. The fan unit 8 is disposed in the accommodation space S to produce an air current F flowing toward the heat dissipation unit 1 as shown in FIG. 19. In other embodiments, the fan unit 8 can also be disposed on an outer side of the first deflector 112 to produce an air current F flowing toward the heat dissipation unit 1.

Figure 18:
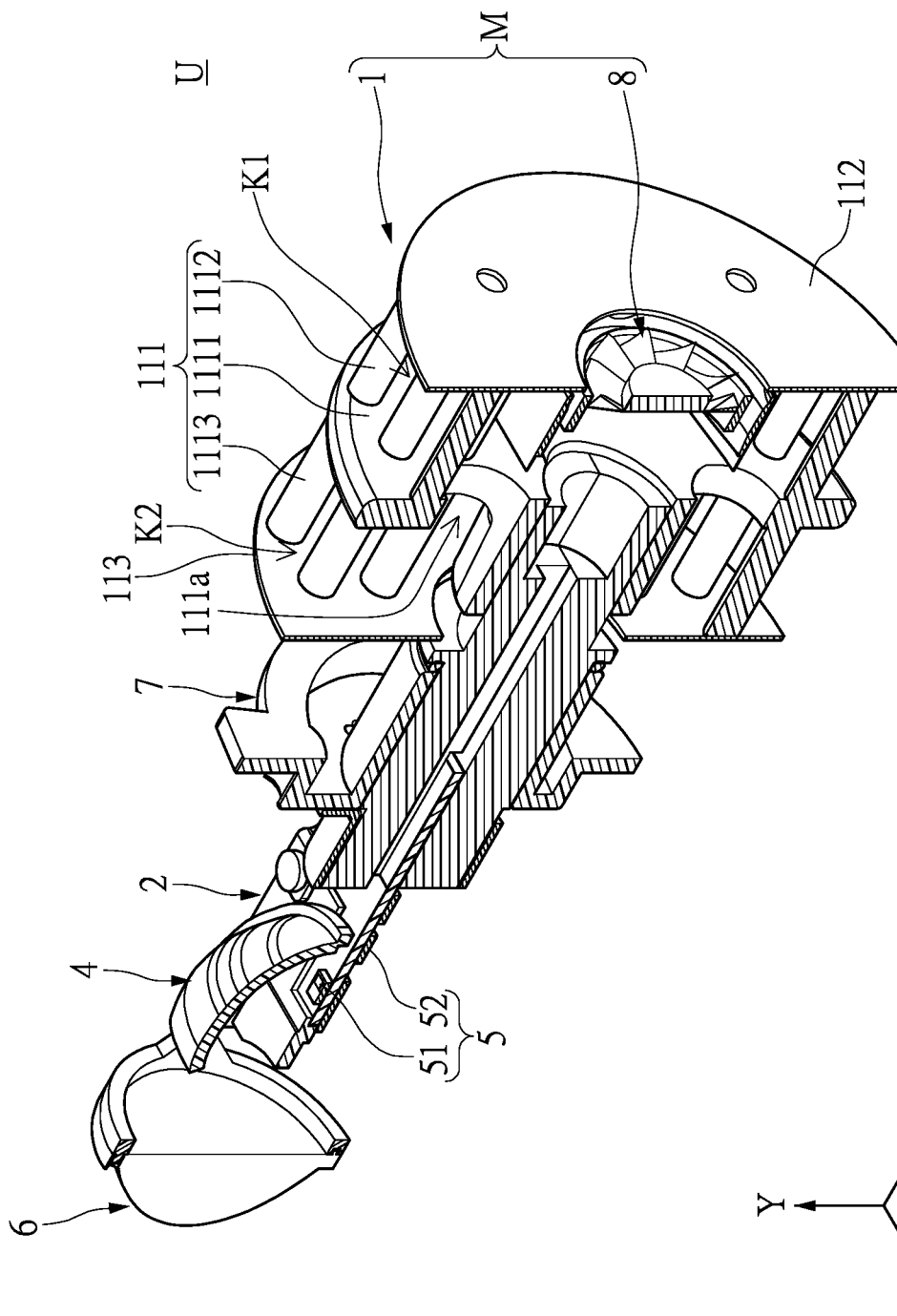
FIG. 18 is a cross-sectional view of the light projection device according to the third embodiment of the present disclosure.

Please refer to FIG. 17 in conjunction with FIG. 18 and FIG. 19. FIG. 18 is a cross-sectional view of the light projection module U. FIG. 19 is a side cross-sectional view of an air current F flowing in the heat dissipation unit 1. Specifically, a first current channel K1 is formed between any two adjacent first extended parts 112 and communicates the main body 1111 of the thermal conductor 111 with the first deflector 112. Similarly, a second current channel K2 is formed between any two adjacent second extended parts 113 and communicates the main body 1111 of the thermal conductor 111 with the second deflector 113.

In FIG. 19, the air current F produced by the fan unit 8 includes a first input current F1A and a second input current F2A. The first input current F1A flows along the first current channel K1 and passes through the main body 1111, the first deflector 112, and the first extended parts 1112 to form a first output current F1B. Similarly, the second input current F2A enters from the air channel 111a of the main body 1111 and flows along the second current channel K2. The second input current F2A passes through the main body 1111, the second deflector 113, and the second extended parts 1113 and forms a second output current F2B.

In conclusion, the light projection module U and the heat dissipation module M of the present disclosure provides the technical feature of "respectively disposing the thermal conducting unit 2 and the holding unit 3 on the heat dissipation unit 1" to achieve the effect of "separating the heat dissipation path structure and the weight loading structure". Compared with the conventional technique, the present disclosure can enhance the weight loading capability and the heat dissipation efficiency.

In addition, the technical feature of "the luminous chip 511S of the first luminous structure 51 and the luminous chip 521S of the second luminous structure 52 are respectively and electrically connected to the conducting layer 23 on two sides of the thermal conducting interface body 21" can achieve the effect of "enhancing the luminous efficiency and the heat dissipation efficiency". Further, the structural design can provide an illumination effect closer to the existing tungsten halogen lamp, halogen lamp, and HID lamp.

Moreover, the technical feature of "forming the first output current F1B by making the first input current F1A flow through the main body 1111, the first deflector 112, and the first extended parts 1112" and "forming the second output current F2B by making the second input current F2A flow through the main body 1111, the second deflector 113, and the second extended parts 1113" can achieve the effect of "enhancing the heat dissipation efficiency". By enhancing the heat dissipation efficiency, the number of the luminous chips 511, 512 set in the first luminous structure 51 and the second luminous structure 52 can be increased; thereby, the luminous flux emitted by the light projection module U can also be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light projection device, comprising:
   a heat dissipation unit;
   a thermal conducting interface unit disposed on the heat dissipation unit, the thermal conducting interface unit including a first surface and a second surface opposite to the first surface;
   a holding unit disposed on the heat dissipation unit;
   a reflective unit disposed on the holding unit;
   a luminous unit disposed on the thermal conducting interface unit, the luminous unit including a first luminous structure disposed on the first surface; and
   a lens unit disposed on the holding unit; wherein the thermal conducting interface unit and the holding unit are respectively disposed on the heat dissipation unit.

2. The light projection device according to claim 1, wherein the reflective unit has a first focal point and a second focal point corresponding to the first focal point, and the first luminous structure corresponds to the first focal point; wherein the luminous unit includes an optical axis and a lens focal point on the optical axis, and the lens focal point corresponds to the second focal point.

3. The light projection device according to claim 2, wherein the first surface and the second surface are parallel to each other.

4. The light projection device according to claim 2, wherein the thermal conducting interface unit includes a thermal conducting interface body, the thermal conducting interface body has a first plate, a second plate, and a connecting plate connected between the first plate and the second plate, and the first surface is disposed on the first plate and the second surface is disposed on the second plate; wherein a predetermined angle between the first surface on the first plate and the second surface on the second plate ranges from 0 degrees to 30 degrees.

5. The light projection device according to claim 2, wherein a line linking the first focal point and the second focal point is inclined relative to the optical axis; a preset angle between the line and the optical axis ranges from 0 degrees to 30 degrees.

6. The light projection device according to claim 2, wherein the thermal conducting interface unit includes a thermal conducting interface body, the thermal conducting interface body has a first plate, a second plate, and a connecting plate connected between the first plate and the second plate, the first surface in on the first plate and the second surface is on the second plate; wherein the first surface of the first plate is tilted toward the second surface of the second plate.

7. The light projection device according to claim 2, wherein the holding unit includes a holding body and a shielding plate disposed on the holding body, and a light pattern having a cut-off line is generated by projecting a first light produced by the first luminous structure through the shielding plate.

8. The light projection device according to claim 2, wherein a first light produced by the first luminous structure includes a first projected light emitting toward the reflective unit, the first projected light is reflected by the reflective unit and forms a first reflected light, and the first reflected light passes through the second focal point of the reflective unit.

9. The light projection device according to claim 2, wherein a thermal conductivity of the thermal conducting interface unit is higher than a thermal conductivity of the heat dissipation unit.

10. The light projection device according to claim 2, wherein a material of the thermal conducting interface unit and a material of the holding unit are different.

11. The light projection device according to claim 2, wherein the thermal conducting interface unit includes a thermal conducting interface body, an insulating layer disposed at two opposite sides of the thermal conducting interface body, and a conducting layer disposed at the two opposite sides of the thermal conducting interface body and on the insulating layer; wherein the first luminous structure includes a luminous chip, the second luminous structure includes a luminous chip, the luminous chip of the first luminous structure is electrically connected to the conducting layer disposed on one side of the thermal conducting interface body, and the luminous chip of the second luminous structure is electrically connected to the conducting layer disposed on the other side of the thermal conducting interface body.

12. The light projection device according to claim 2, wherein the thermal conducting interface unit includes a thermal conducting interface body, an insulating layer disposed at two opposite sides of the thermal conducting interface body, and a conducting layer disposed at the two opposite sides of the thermal conducting interface body and on the insulating layer; wherein the first luminous structure includes a substrate and a luminous chip disposed on the substrate of the first luminous structure, the second luminous structure includes a substrate and a luminous chip disposed on the substrate of the second luminous structure, the luminous chip of the first luminous structure is electrically connected to the conducting layer disposed on one side of the thermal conducting interface body, and the luminous chip of the second luminous structure is electrically connected to the conducting layer disposed on the other side of the thermal conducting interface body.

13. The light projection device according to claim 2, further comprising a fan unit disposed on the heat dissipation unit; wherein the fan unit produces an air current toward the heat dissipation unit.

14. The light projection device according to claim 3, further comprising a base unit disposed on the heat dissipation unit; wherein the base unit has a referenced axis near the optical axis, and a predetermined distance between the referenced axis and the optical axis ranges from 0 mm to 10 mm.

15. The light projection device according to claim 4, further comprising a base unit disposed on the heat dissipation unit; wherein the base unit has a referenced axis, and the referenced axis and the optical axis overlap with each other.

16. The light projection device according to claim 4, wherein the reflective unit includes a first reflective surface and a second reflective surface connected with the first reflective surface, the first reflective surface and the second reflective surface are respectively on opposite sides relative to the optical axis, and a curvature of the first reflective surface and a curvature of the second reflective surface are the same or different.

17. The light projection device according to claim 8, wherein the light projection device is disposed corresponding to a reflective structure in an automobile headlamp device, a second light produced by the second luminous device includes a second projected light emitting toward the reflective unit, and the second projected light is reflected by the reflective unit and forms a second reflected light.

18. The light projection device according to claim 8, wherein the first reflected light produced by the first luminous structure projects toward the lens unit and forms a light pattern conforming to automobile headlight regulations.

19. The light projection device according to claim 13, wherein the heat dissipation unit includes a heat dissipation body and a connecting part connected with the heat dissipation body; wherein the heat dissipation body has a thermal conductor, a first deflector disposed on one side of the thermal conductor, and a second deflector disposed on the other side of the thermal conductor, the thermal conductor having a main body, a plurality of first extended parts, and a plurality of second extended parts, the main body having a first surface, a second surface opposite to the first surface, and an air channel formed through the main body; wherein the first extended parts are disposed on the first surface of the main body and disposed between the main body and the first deflector, the second extended parts are disposed on the second surface of the main body and disposed between the main body and the second deflector; wherein a first current channel is formed between any two adjacent first extended parts and communicates the main body of the thermal conductor with the first deflector, a second current channel is formed between any two second extended parts and communicates the main body of the thermal conductor with the second deflector; wherein the air current produced by the fan unit includes a first input current and a second input current; wherein the first input current flows along the first current channel and passes through the main body, the first deflector, and the first extended parts to form a first output current; wherein the second input current enters from the air channel of the main body and flows along the second current channel, the second input current passing through the main body, the second deflector, and the second extended parts and forming a second output current.

20. The light projection device according to claim 14, wherein the referenced axis is between a luminous surface of the first luminous structure and a luminous surface of a second luminous structure; wherein a first gap distance between the luminous surface of the first luminous structure and the referenced axis is smaller than 10 mm, and a second gap distance between the luminous surface of the second luminous structure and the referenced axis is smaller than 2 mm.

21. A light projection device, comprising:
a heat dissipation unit including a heat dissipation body and a connecting part connected with the heat dissipation body;
a thermal conducting interface unit disposed on the connecting part of the heat dissipation unit; wherein the thermal conducting interface unit includes a thermal conducting interface body, an insulating layer disposed at two opposite sides of the thermal conducting interface body, and a conducting layer disposed at the two opposite sides of the thermal conducting interface body and on the insulating layer; wherein the two opposite sides of the thermal conducting interface body respectively have a first surface and a second surface exposed to the exterior environment; and
a luminous unit disposed on the thermal conducting interface unit; wherein the luminous unit includes a first luminous structure disposed on the first surface and a second luminous structure disposed on the second surface; wherein the first luminous structure has a luminous chip and the second luminous structure has a luminous chip, the luminous chip of the first luminous structure is electrically connected to the conducting layer on one side of the thermal conducting interface body, and the luminous chip of the second luminous structure is electrically connected to the conducting layer on the other side of the thermal conducting interface body.

22. The light projection device according to claim 21, further comprising a base unit disposed on the heat dissipation unit; wherein the base unit has a referenced axis disposed between a luminous surface of the first luminous structure and a luminous surface of the second luminous structure; wherein a first gap distance between the luminous surface of the first luminous structure and the referenced axis is smaller than 2 mm, and a second gap distance between the luminous surface of the second luminous structure and the referenced axis is smaller than 2 mm.

23. The light projection device according to claim 21, wherein the first luminous structure includes a substrate, the luminous chip of the first luminous structure is disposed on the substrate of the first luminous structure, the second luminous structure includes a substrate, and the luminous chip of the second luminous structure is disposed on the substrate of the second luminous structure.

24. A light projection device, comprising:
   a thermal conducting interface unit including a first plate, a second plate, and a connecting plate connected between the first plate and the second plate; wherein a first surface of the first plate is tilted toward a second surface of the second plate;
   a reflective unit disposed on the thermal conducting interface unit and having a first focal point and a second focal point corresponding to the first focal point of the reflective unit;
   a luminous unit disposed on the thermal conducting interface unit; wherein the luminous unit includes a first luminous structure disposed on the first surface and a second luminous structure disposed on the second surface; wherein the first luminous structure corresponds to the first focal point; and
   a lens unit disposed on the thermal conducting interface unit, the lens unit having an optical axis and a lens focal point on the optical axis; wherein the lens focal point corresponds to the second focal point of the reflective unit.

25. The light projection device according to claim 24, further comprising a heat dissipation unit; wherein the thermal conducting interface unit is disposed on the heat dissipation unit.

26. The light projection device according to claim 24, wherein a predetermined angle between the first surface of the first plate and the second surface of the second plate ranges from 1 degree to 30 degrees.

27. The light projection device according to claim 25, further comprising a holding unit disposed on the heat dissipation unit; wherein the holding unit includes a holding body, a holding component disposed on the holding body and connected with the heat dissipation unit, and a lens holder disposed on the holding body; wherein the reflective unit is disposed on the holding body and the lens unit is disposed on the lens holder.

\* \* \* \* \*